(12) United States Patent
Jimbo et al.

(10) Patent No.: US 6,173,408 B1
(45) Date of Patent: Jan. 9, 2001

(54) PROCESSOR

(75) Inventors: Takuya Jimbo; Akihiko Ohtani; Toshiyuki Araki, all of Osaka (JP)

(73) Assignee: Matsushita Electric Industrial Co., Ltd., Osaka (JP)

(*) Notice: Under 35 U.S.C. 154(b), the term of this patent shall be extended for 0 days.

(21) Appl. No.: 09/145,646

(22) Filed: Sep. 2, 1998

(30) Foreign Application Priority Data

Sep. 3, 1997 (JP) .................................................. 9-238014

(51) Int. Cl.⁷ .................................................. C06F 1/32
(52) U.S. Cl. ............................ 713/322; 712/32; 713/600
(58) Field of Search ................................ 713/322, 601, 713/300, 320, 324, 323, 321, 500, 600; 712/23, 36, 32; 710/100

(56) References Cited

U.S. PATENT DOCUMENTS

| | | | |
|---|---|---|---|
| 5,452,434 | * 9/1995 | MacDonald | 713/601 |
| 5,548,765 | * 8/1996 | Tsunoda et al. | 713/322 |
| 5,615,376 | * 3/1997 | Ranganathan | 713/322 |
| 5,787,297 | * 7/1998 | Lin | 713/322 |
| 5,951,689 | * 9/1999 | Evoy et al. | 713/322 |
| 5,961,617 | * 10/1999 | Tsang | 710/100 |
| 5,974,555 | * 10/1999 | Nakayama | 713/322 |
| 5,996,083 | * 11/1999 | Gupta et al. | 713/322 |

FOREIGN PATENT DOCUMENTS

| | | |
|---|---|---|
| 3137870 | 4/1983 | (DE) . |
| 0050844 | 5/1982 | (EP) . |
| 0855639 | 7/1998 | (EP) . |
| 63-178620 | 7/1988 | (JP) . |
| 03123919 | 5/1991 | (JP) . |
| 04140810 | 5/1992 | (JP) . |
| 04302014 | 10/1992 | (JP) . |
| 05324871 | 12/1993 | (JP) . |
| 08065496 | 3/1996 | (JP) . |

* cited by examiner

Primary Examiner—John A. Follansbee
Assistant Examiner—Walter Benson
(74) Attorney, Agent, or Firm—McDermott, Will & Emery

(57) ABSTRACT

An operation controller, an operation unit and a memory are provided. The operation controller always receives a non-gated clock signal from a clock controller. When an operation initiating signal and a parameter signal indicating resources to be used in the operation unit are generated by a microcontroller, the operation controller asserts a request signal. In response to the request signal, respective gated clock signals are supplied from the clock controller to the operation unit and to the memory. The operation controller determines whether or not a status signal supplied from the operation unit satisfies a predetermined end condition. If the signal satisfies the end condition, the operation controller negates the request signal. As a result, the supply of the clock signals to the operation unit and to the memory is stopped.

12 Claims, 20 Drawing Sheets

Fig. 17

| INSTRUCTION | (NUMBER OF EXECUTION CYCLES) | PREDICTED POWER CONSUMPTION |
|---|---|---|
| JCC | (1~3) | 1 |
| SET | ( 1 ) | 1 |
| MVD | ( 1 ) | 2 |
| ADD | ( 1 ) | 3 |
| SUB | ( 1 ) | 3 |
| MPY | ( 2 ) | 8 |
| AC | ( 300 ) | 12 |
| QM | ( 150 ) | 12 |
| PSUB | ( 150 ) | 15 |
| VLC | ( 200 ) | 25 |
| DCT | ( 200 ) | 43 |
| VIF | ( 250 ) | 45 |
| MIF | ( 250 ) | 50 |

Fig. 18

1. SET R2, 1234
2. MPY R1, 135, 74
3. ADD R4, R2, R1
4. VIF
5. DCT
6. SET R3, 0
7. QM
8. QM
9. PSUB
10. AC
11. MIF
12. VLC
13. QM
14. DCT
END

PROCESSOR

BACKGROUND OF THE INVENTION

The present invention relates to a processor having a data-dependent clock gating function.

Clock gating technique for stopping the supply of a clock signal to a circuit block in a processor when it is not necessary to operate the circuit block is known. In accordance with this technique, the power consumption of a processor can be reduced.

An image processing apparatus disclosed in Japanese Laid-Open Publication No. 8-65496 includes two circuit blocks. In each of a plurality of operation modes of the apparatus, the supply of a clock signal to at least one of the two circuit blocks is stopped. An operation mode signal, supplied from the outside of the image processing apparatus, specifies in which mode the apparatus should operate.

A microcomputer disclosed in Japanese Laid-Open Publication No. 5-324871 includes a central processing unit (CPU) and a plurality of peripheral hardware devices. Each of the peripheral hardware devices incorporates a core section and a clock controller. Each clock controller allows the supply of a clock signal to the associated core portion thereof only within a predetermined time zone between a time when the peripheral hardware device is selected by the CPU and a time determined by a timer.

A video encoder operating in compliance with an MPEG (Moving Picture Experts Group) standard includes a large number of operation units for motion prediction, DCT (discrete cosine transform), quantization, variable length coding and the like. It is known that the processing time of each such operation unit is dependent on image data. However, neither the conventional image processing apparatus nor the conventional microcomputer could perform data-dependent clock gating.

SUMMARY OF THE INVENTION

The object of the present invention is providing a processor having a data-dependent clock gating function.

In order to accomplish this object, according to the present invention, the operating status of an operation unit is monitored by an operation controller and the supply of a clock signal to the operation unit is allowed only while the operation unit is actually operating.

Specifically, the processor according to the present invention includes an operation unit, a microcontroller, an operation controller and a clock controller having the following functions. The operation unit is a unit having the functions of performing operation processing on data and supplying a status signal representing the status of the operation processing. The microcontroller has the function of generating an operation initiating signal. The operation controller is a controller asserting a request signal when the operation controller receives the operation initiating signal generated from the microcontroller, determining whether or not the status signal supplied from the operation unit satisfies a predetermined end condition, and negating the request signal if the status signal satisfies the end condition. The clock controller is a controller supplying a clock signal to the operation unit such that the operation unit can perform operation processing if the request signal has been asserted, and stopping the supply of the clock signal to the operation unit if the request signal has been negated.

According to the present invention, the time required for the operation unit to perform the operation processing is dependent on data. If the operation processing ends early, then the operation controller negates the request signal at early stage. Accordingly, the clock controller realizes data-dependent clock gating.

BRIEF DESCRIPTION OF THE DRAWINGS

FIG. 17 is a table showing an exemplary content of a power consumption table shown in FIG. 11.

FIG. 18 shows an exemplary execution program of the processor shown in FIG. 10.

DETAILED DESCRIPTION OF THE INVENTION

Figure 1:
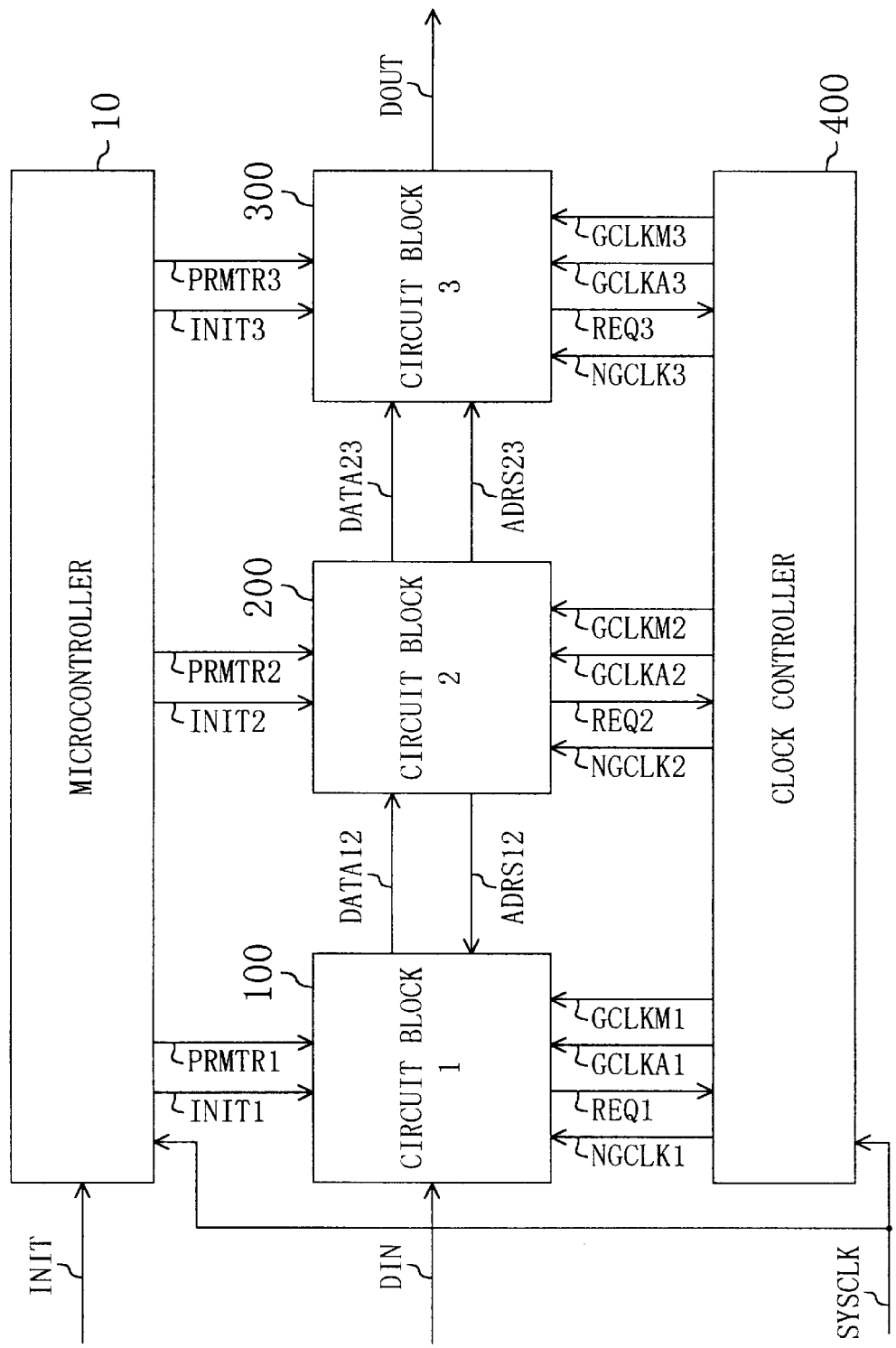
FIG. 1 is a block diagram illustrating an exemplary configuration for a processor according to the present invention.

FIG. 1 illustrates an exemplary configuration for a processor according to the present invention. The processor shown in FIG. 1 includes: a microcontroller 10; first, second and third circuit blocks 100, 200, 300, which can operate in parallel with each other; and a clock controller 400. INIT denotes an external initiating signal provided to the microcontroller 10. SYSCLK denotes a system clock signal provided to the microcontroller 10 and the clock controller 400. The microcontroller 10 is controllable based on a program, and generates an operation initiating signal INIT1 and a parameter signal PRMTR1 for the first circuit block 100, an operation initiating signal INIT2 and a parameter signal PRMTR2 for the second circuit block 200 and an operation initiating signal INIT3 and a parameter signal PRMTR3 for the third circuit block 300, respectively. The first circuit block 100 receives data input DIN, while the third circuit block 300 supplies data output DOUT. The second circuit block 200 supplies an address ADRS12 to the first circuit block 100 and an address ADRS23 to the third circuit block 300, respectively. DATA12 denotes data transmitted from the first circuit block 100 to the second circuit block 200. DATA23 denotes data transmitted from the second circuit block 200 to the third circuit block 300. The first circuit block 100 supplies a request signal REQ1 to the clock controller 400 and receives a non-gated clock signal NGCLK1 and gated clock signals GCLKA1 and GCLKM1 from the clock controller 400. The second circuit block 200 supplies a request signal REQ2 to the clock controller 400 and receives a non-gated clock signal NGCLK2 and gated clock signals GCLKA2 and GCLKM2 from the clock controller 400. The third circuit block 300 supplies a request signal REQ3 to the clock controller 400 and receives a non-gated clock signal NGCLK3 and gated clock signals GCLKA3 and GCLKM3 from the clock controller 400.

Figure 2:
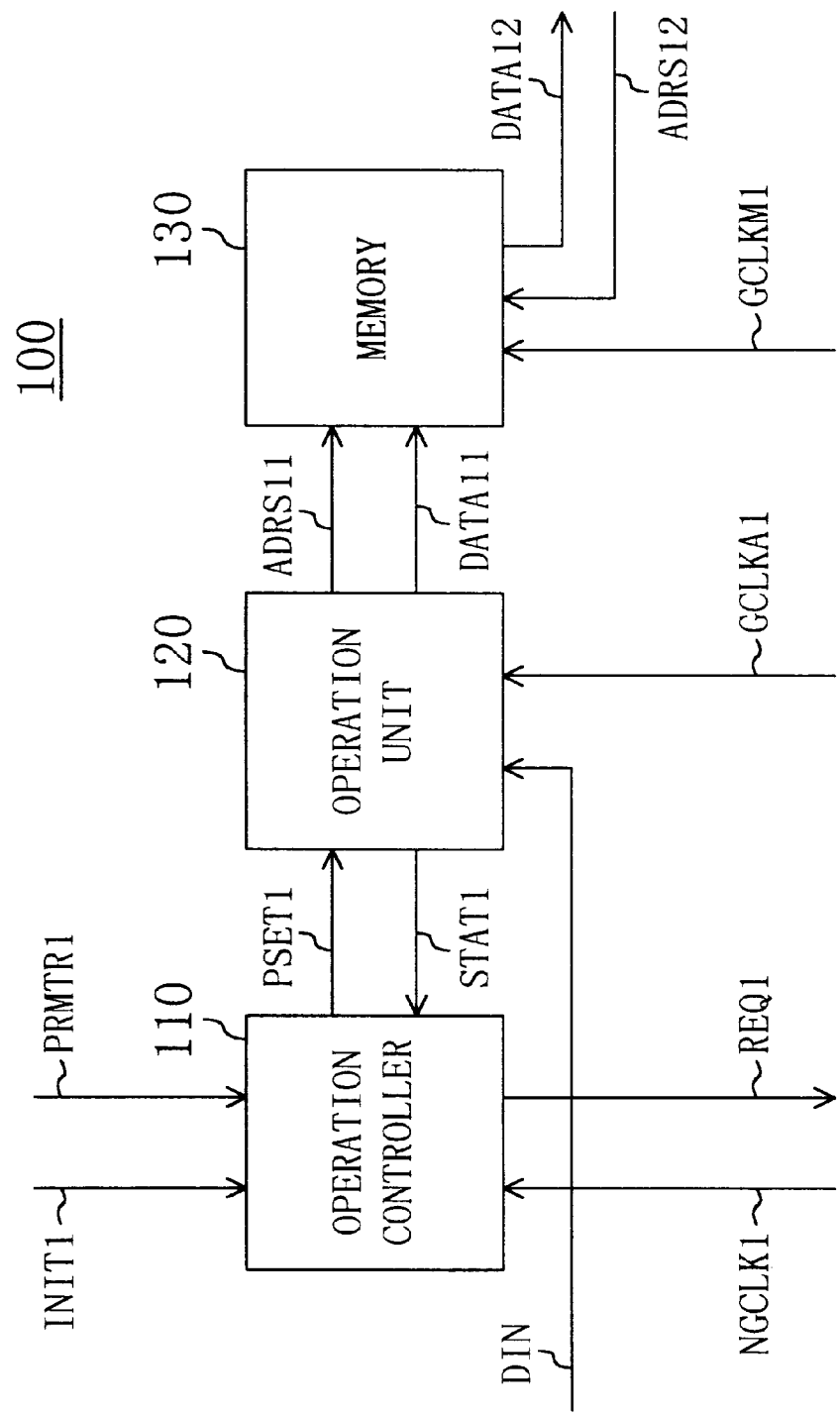
FIG. 2 is a block diagram illustrating an internal configuration for a first circuit block shown in FIG. 1.

FIG. 2 illustrates an internal configuration for the first circuit block 100 shown in FIG. 1. The first circuit block 100 includes: an operation controller 110; an operation unit 120; and a memory 130. The operation controller 110 receives INIT1 and PRMTR1 from the microcontroller 10 and NGCLK1 from the clock controller 400, respectively, and supplies REQ1 to the clock controller 400. The operation controller 110 further supplies a parameter setting signal PSET1 to the operation unit 120 and receives a status signal STAT1 from the operation unit 120. The operation unit 120 receives DIN from the outside and GCLKA1 from the clock controller 400, respectively, and supplies an address ADRS11 and data DATA11 to the memory 130. The memory 130 is a clock synchronous SRAM (static random access memory), for example, receives ADRS12 from the second circuit block 200 and GCLKM1 from the clock controller 400, respectively, and supplies DATA12 to the second circuit block 200.

Figure 3:
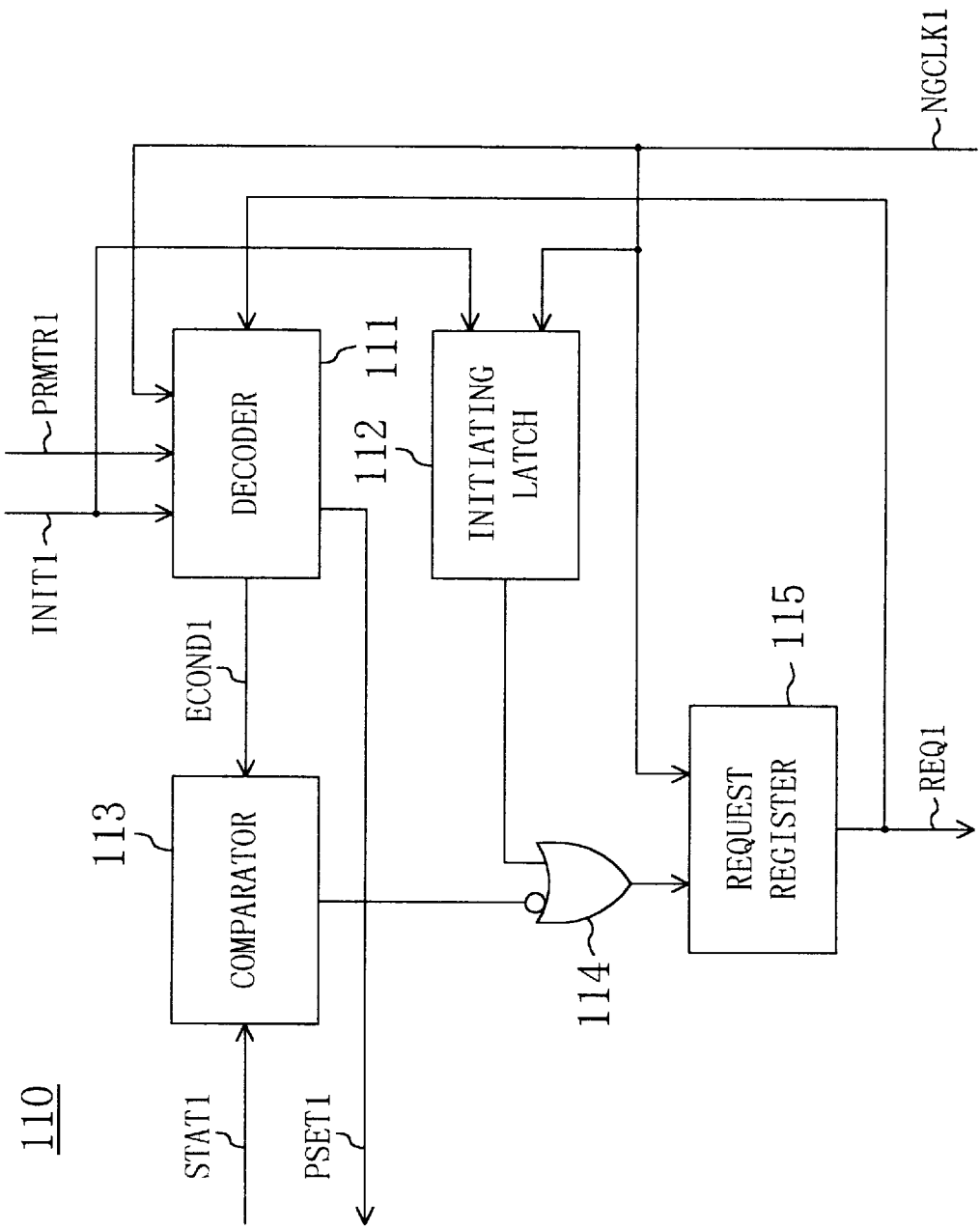
FIG. 3 is a block diagram illustrating an internal configuration for an operation controller shown in FIG. 2.

FIG. 3 illustrates an internal configuration for the operation controller 110 shown in FIG. 2. The operation controller 110 includes: a decoder 111; an initiating latch 112; a comparator 113; a logic gate 114; and a request register 115. The decoder 111 receives INIT1 and PRMTR1 from the microcontroller 10, REQ1 from the request register 115 and NGCLK1 from the clock controller 400, respectively, and supplies PSET1 to the operation unit 120. The decoder 111 further supplies an end condition signal ECOND1 to the comparator 113. If REQ1 is at L (low) level, then INIT1 and PRMTR1 are enabled and a decoding operation is initiated. The initiating latch 112 is constituted by a single-stage flip-flop or by multiple-stage flip-flops and latches INIT1, which is a pulse signal, in synchronism with NGCLK1. Thus, the output of the initiating latch 112 is asserted to H (high) level during a cycle period of NGCLK1 corresponding to the number of stages of the flip-flops. The comparator 113 compares STAR1 supplied from the operation unit 120 with ECOND1 supplied from the decoder 111. If STAT1 is equal to ECOND1, then the output of the comparator 113 is asserted to H level. Otherwise, the output is negated to L level. If the output of the initiating latch 112 is at H level or if the output of the comparator 113 is at L level, the logic gate 114 supplies a signal at H level to the request register 115. Otherwise, the logic gate 114 supplies a signal at L level to the request register 115. The request register 115 latches the output of the logic gate 114 in synchronism with NGCLK1. It is REQ1 that the output of the request register 115 is. In the initial state, REQ1 is negated to L level.

Figure 4:
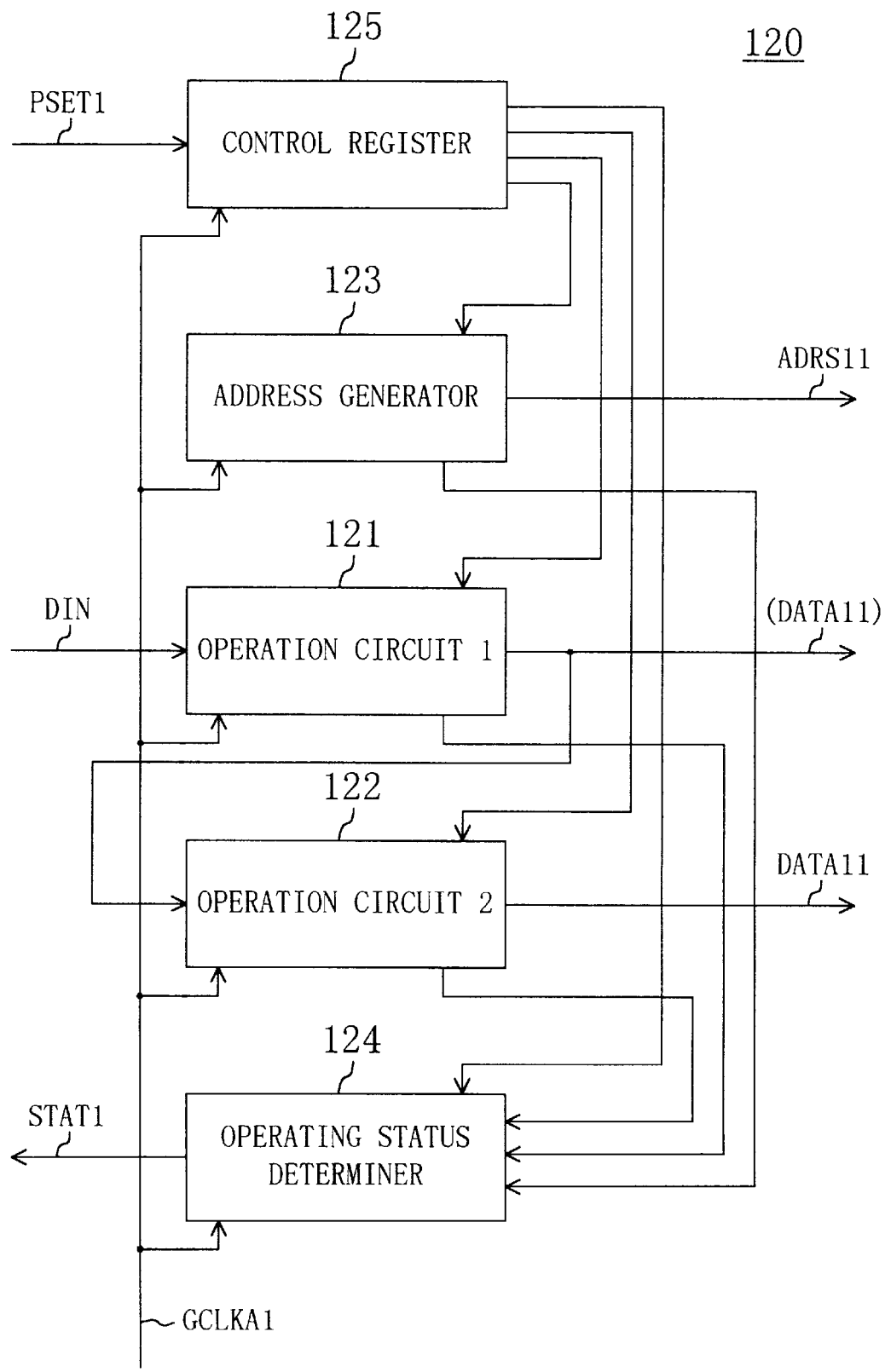
FIG. 4 is a block diagram illustrating an internal configuration for an operation unit shown in FIG. 2.

FIG. 4 illustrates an internal configuration for the operation unit 120 shown in FIG. 2. The operation unit 120 includes: a first operation circuit 121; a second operation circuit 122; an address generator 123; an operating status determiner 124; and a control register 125, each of these components receiving GCLKA1 supplied from the clock controller 400. The first operation circuit 121 receives DIN from the outside and supplies the results of operation to the second operation circuit 122. The second operation circuit 122 supplies DATA11 to the memory 130. Alternatively, DATA11 may be the operation result of the first operation circuit 121. The address generator 123 supplies ADRS11 to the memory 130. The operating status determiner 124 monitors the operating statuses of the first operation circuit 121, the second operation circuit 122 and the address generator 123, thereby supplying STAT1 to the operation controller 110. PSET1 supplied from the operation controller 110 contains information indicating which of a plurality of resources of the operation unit 120 should be used. The control register 125 retains and transmits the information to the first operation circuit 121, the second operation circuit 122, the address generator 123 and the operating status determiner 124.

Figure 5:
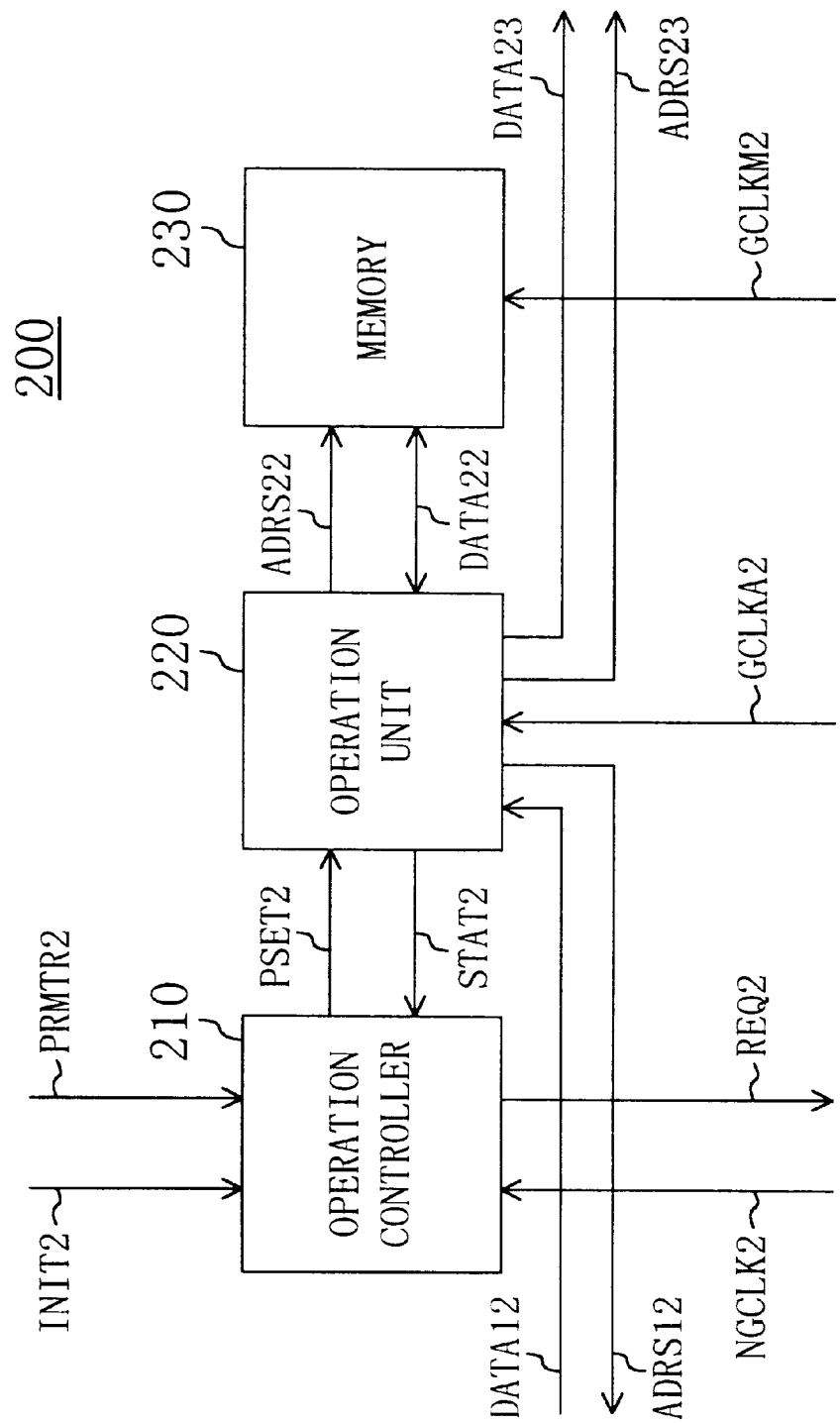
FIG. 5 is a block diagram illustrating an internal configuration for a second circuit block shown in FIG. 1.

FIG. 5 illustrates an internal configuration for the second circuit block 200 shown in FIG. 1. The second circuit block 200 includes: an operation controller 210; an operation unit 220; and a memory 230. The operation controller 210 receives INIT2 and PRMTR2 from the microcontroller 10 and NGCLK2 from the clock controller 400, respectively, and supplies REQ2 to the clock controller 400. The operation controller 210 further supplies a parameter setting signal PSET2 to the operation unit 220 and receives a status signal STAT2 from the operation unit 220. The operation unit 220 receives DATA12 from the first circuit block 100 and GCLKA2 from the clock controller 400, respectively, and supplies ADRS12 to the first circuit block 100. The operation unit 220 further supplies an address ADRS22 to the memory 230 and ADRS23 and DATA23 to the third circuit block 300, respectively, and exchanges data DATA22 with the memory 230. The memory 230 is a clock synchronous SRAM, for example, and receives GCLKM2 from the clock controller 400. The respective internal configurations of the operation controller 210 and the operation unit 220 are substantially the same as those shown in FIGS. 3 and 4, respectively, except that the operation unit 220 includes three address generators.

Figure 6:
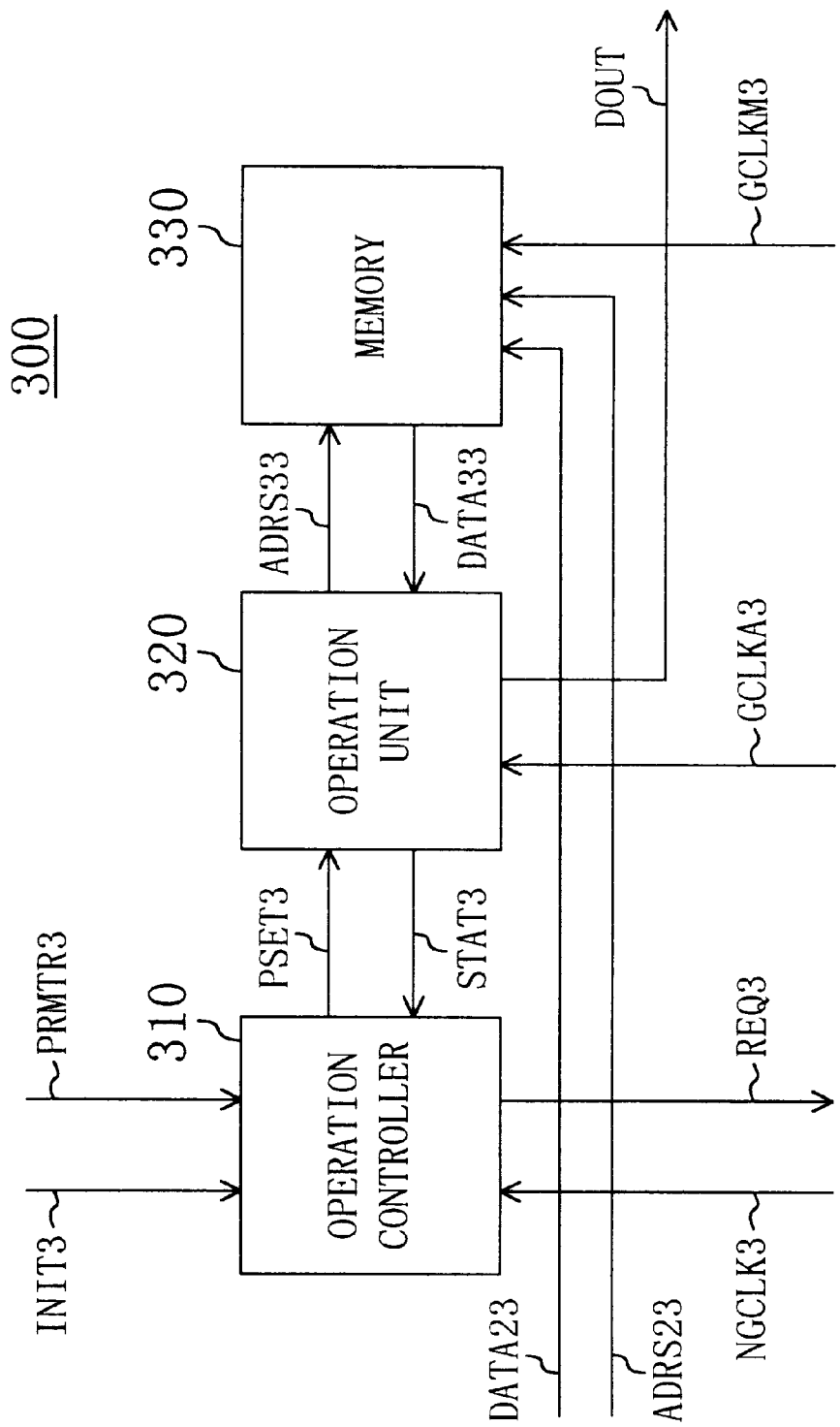
FIG. 6 is a block diagram illustrating an internal configuration for a third circuit block shown in FIG. 1.

FIG. 6 illustrates an internal configuration for the third circuit block 300 shown in FIG. 1. The third circuit block 300 includes: an operation controller 310; an operation unit 320; and a memory 330. The operation controller 310 receives INIT3 and PRMTR3 from the microcontroller 10 and NGCLK3 from the clock controller 400, respectively, and supplies REQ3 to the clock controller 400. The operation controller 310 further supplies a parameter setting signal PSET3 to the operation unit 320 and receives a status signal STAT3 from the operation unit 320. The operation unit 320 receives GCLKA3 from the clock controller 400 and supplies DOUT to the outside. The operation unit 320 further supplies an address ADRS33 to the memory 330 and receives data DATA33 from the memory 330. The memory 330 is a clock synchronous SRAM, for example, and receives ADRS23 and DATA23 from the second circuit block 200 and GCLKM3 from the clock controller 400, respectively. The respective internal configurations of the operation controller 310 and the operation unit 320 are substantially the same as those shown in FIGS. 3 and 4, respectively.

Figure 7:
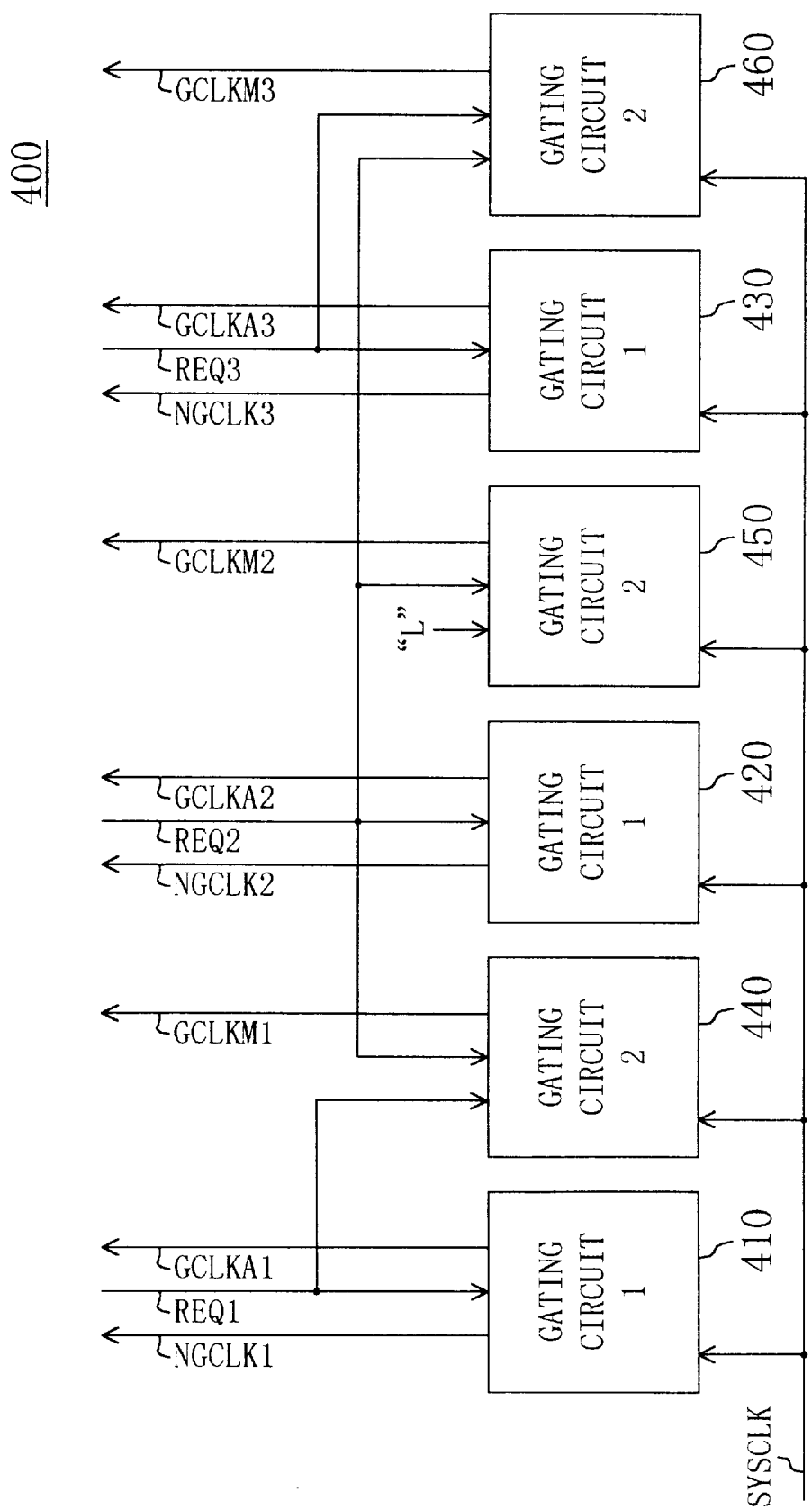
FIG. 7 is a block diagram illustrating an internal configuration for a clock controller shown in FIG. 1.

FIG. 7 illustrates an internal configuration for the clock controller 400 shown in FIG. 1. The clock controller 400 includes three first gating circuits 410, 420, 430, each having the same configuration, and three second gating circuits 440, 450, 460, each having the same configuration. SYSCLK is supplied to all of these gating circuits. REQ1 supplied from the operation controller 110 is provided to the first gating circuit 410 and to the second gating circuit 440. REQ2 supplied from the operation controller 210 is provided to the first gating circuit 420 and to the three second gating circuits 440, 450, 460. One of the inputs of the second gating circuit 450 is fixed at L level. REQ3 supplied from the operation controller 310 is provided to the first gating circuit 430 and to the second gating circuit 460. The first gating circuit 410 supplies NGCLK1 to the operation controller 110 and GCLKA1 to the operation unit 120, respectively. The first gating circuit 420 supplies NGCLK2 to the operation controller 210 and GCLKA2 to the operation unit 220, respectively. The first gating circuit 430 supplies NGCLK3 to the operation controller 310 and GCLKA3 to the operation unit 320, respectively. The second gating circuits 440, 450, 460 supply GCLKM1, GCLKM2, GCLKM3 to the memories 130, 230, 330, respectively.

Figure 8:
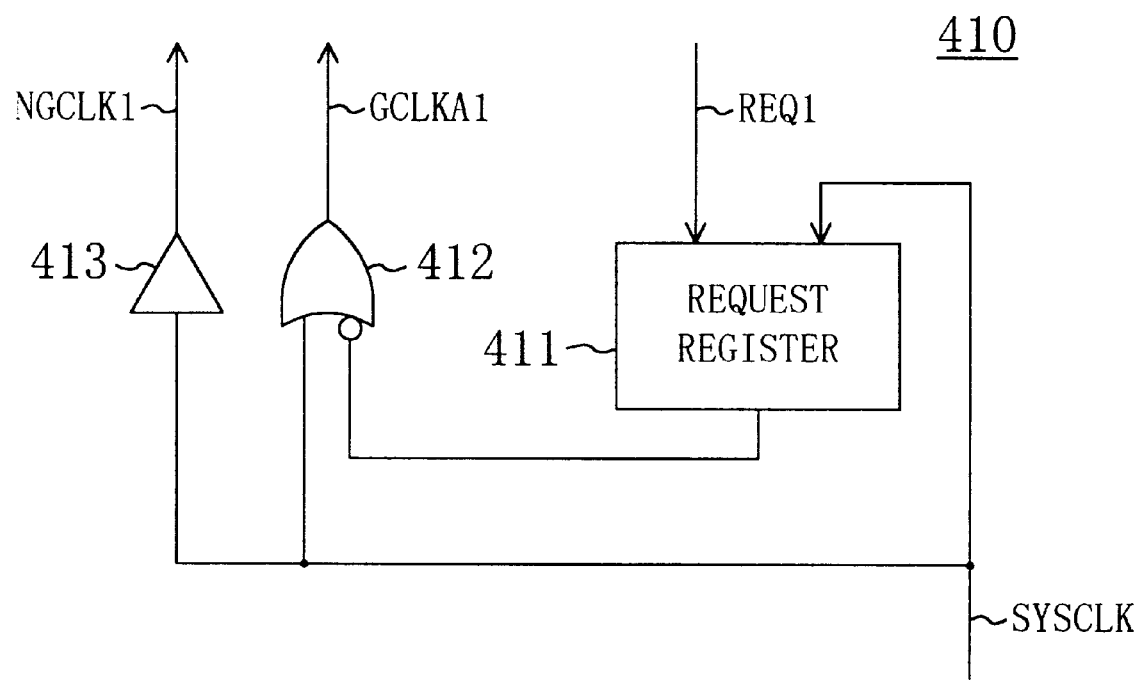
FIG. 8 is a block diagram illustrating an internal configuration for a first gating circuit shown in FIG. 7.

FIG. 8 illustrates an internal configuration for the first gating circuit 410 shown in FIG. 7. The first gating circuit 410 includes: a request register 411; a logic gate 412; and a buffer 413. The request register 411 latches REQ1, supplied from the operation controller 110, in synchronism with SYSCLK. If the output of the request register 411 is asserted to H level, then the logic gate 412 transmits SYSCLK to the operation unit 120 as GCLKA1. Alternatively, if the output of the request register 411 is negated to L level, then the logic gate 412 stops the transmission of SYSCLK to the operation unit 120. While the transmission of SYSCLK is stopped, GCLKA1 is fixed at H level. The buffer 413 always transmits SYSCLK to the operation controller 110 as NGCLK1.

Figure 9:
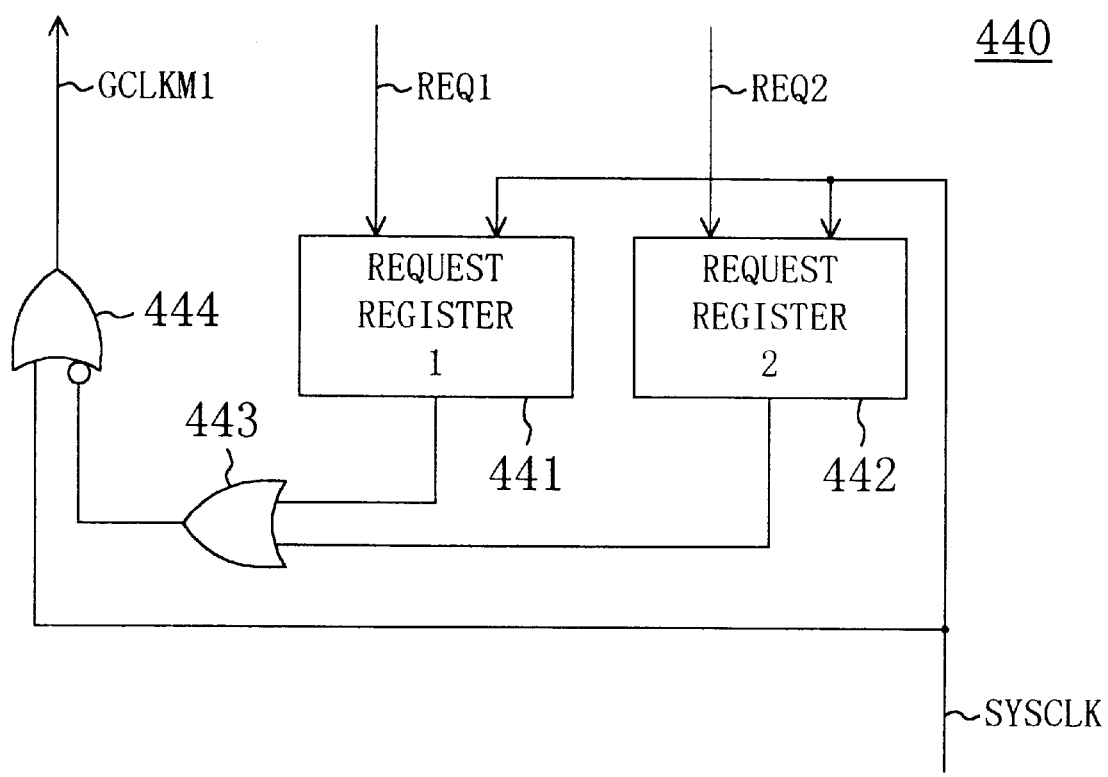
FIG. 9 is a block diagram illustrating an internal configuration for a second gating circuit shown in FIG. 7.

FIG. 9 illustrates an internal configuration for the second gating circuit 440 shown in FIG. 7. The second gating circuit 440 includes: a first request register 441; a second request register 442; and logic gates 443, 444. The first request register 441 latches REQ1, supplied from the operation controller 110, in synchronism with SYSCLK. The second request register 442 latches REQ2, supplied from the operation controller 210, in synchronism with SYSCLK. If either the output of the first request register 441 or that of the second request register 442 is asserted to H level, then the logic gates 443, 444 transmit SYSCLK to the memory 130 as GCLKM1. Alternatively, if the outputs of the first and second request registers 441 and 442 are both negated to L level, then the logic gates 443 and 444 stop the transmission of SYSCLK to the memory 130. While the transmission of SYSCLK is stopped, GCLKM1 is fixed at H level.

In the processor shown in FIG. 1, when INIT is asserted, the microcontroller 10 starts to operate in accordance with the program described in an internal instruction memory (not shown). The microcontroller 10 can operate the first, second and third circuit blocks 100, 200, 300 in parallel with each other. For example, in order to operate the first circuit block 100, the microcontroller 10 generates INIT1 and PRMTR1 for the first circuit block 100. PRMTR1 is a signal indicating which of a plurality of resources of the operation unit 120 in the first circuit block 100 should be used. The operation controller 110 in the first circuit block 100 always receives NGCLK1 from the clock controller 400. Thus, as soon as INIT1 is generated from the microcontroller 10, the operation controller 110 can assert REQ1 at H level. In response to the assertion of REQ1, the clock controller 400 starts to supply GCLKA1 to the operation unit 120 and GCLKM1 to the memory 130, respectively. On the other hand, while REQ1 is at L level, the decoder 111 in the operation controller 110 takes in and decodes PRMTR1. The decoding result is reflected in PSET1 and ECOND1. The respective bits of PSET1 and ECOND1 correspond to the controllable resources in the operation unit 120. That is to say, the operation controller 110 has the functions of setting the internal configuration of the operation unit 120 and changing ECOND1 in accordance with PRMTR1. The operation unit 120 performs operation processing on DIN and writes DATA11, resulting from the operation processing, into the memory 130. The status of the operation processing in the operation unit 120 is reflected in STAT1. The operation controller 110 determines whether or not STAT1 supplied from the operation unit 120 satisfies a predetermined end condition (defined by ECOND1). If STAT1 satisfies the end condition, then the operation controller 110 negates REQ1 at L level. That is to say, at a point in time when the operation processing ends in the operation unit 120, REQ1 is returned to L level. In response to the negation of REQ1 to L level, the clock controller 400 stops the supply of GCLKA1 to the operation unit 120 and GCLKM1 to the memory 130, respectively.

As can be understood, in the processor shown in FIG. 1, the operation controllers 110, 210, 310 monitor the respective operating statuses of the operation units 120, 220 and 320 and allow the supply of a clock signal only to an operation unit actually operating, thereby realizing data-dependent clock gating. Accordingly, the power consumption of the processor can be reduced as compared with conventional clock gating technique.

Figure 10:
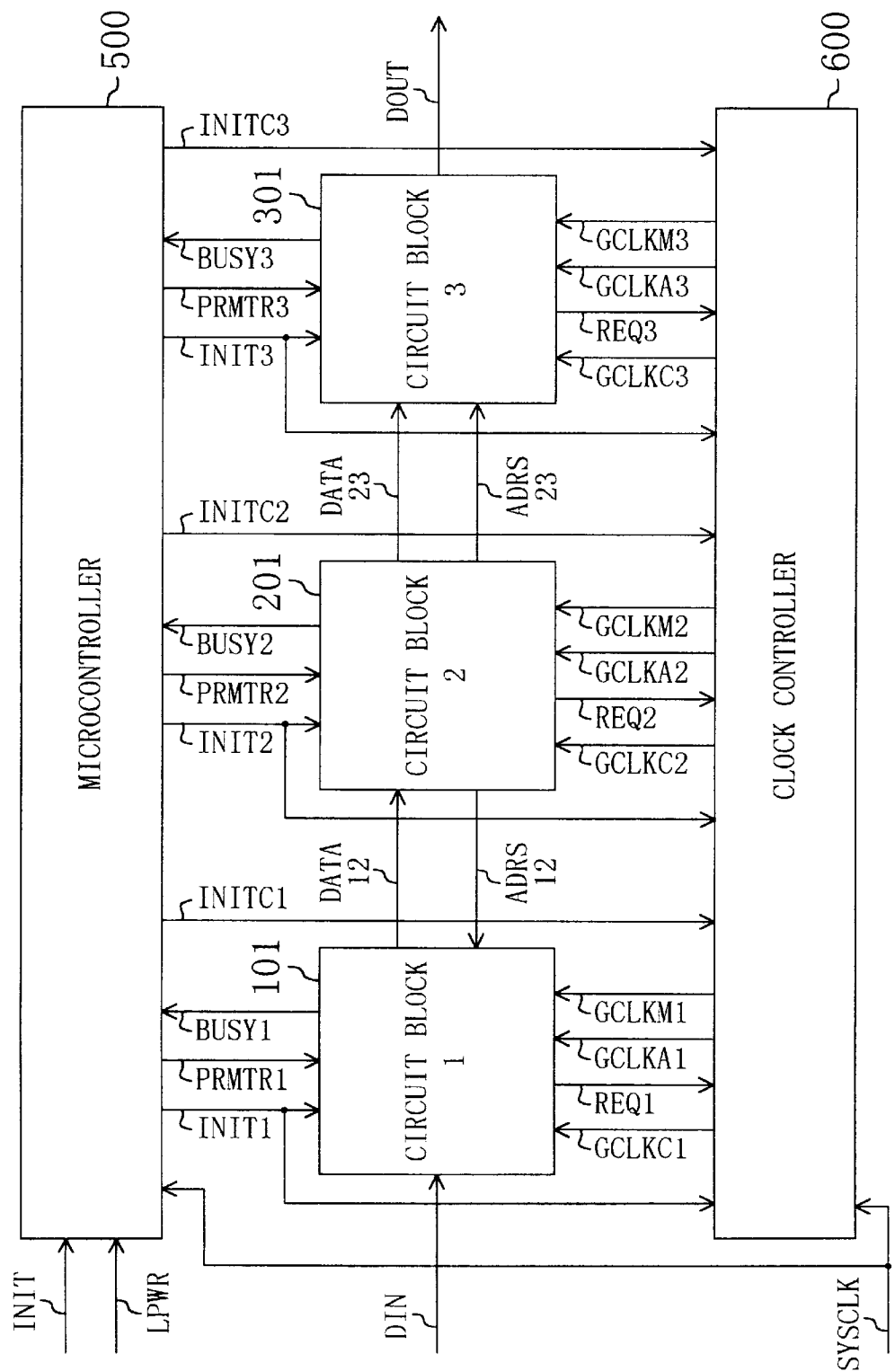
FIG. 10 is a block diagram illustrating another exemplary configuration for a processor according to the present invention.

FIG. 10 illustrates another exemplary configuration for a processor according to the present invention. The processor shown in FIG. 10 includes: a microcontroller 500; first, second and third circuit blocks 101, 201, 301, which can operate in parallel with each other; and a clock controller 600. INIT denotes an external initiating signal provided to the microcontroller 500. LPWR denotes a low power signal provided to the microcontroller 500. SYSCLK denotes a system clock signal provided to the microcontroller 500 and to the clock controller 600. The microcontroller 500 is controllable based on a program. The microcontroller 500 generates: an operation initiating signal INIT1 for the first circuit block 101 and the clock controller 600; a parameter signal PRMTR1 for the first circuit block 101; an operation initiating signal INIT2 for the second circuit block 201 and the clock controller 600; a parameter signal PRMTR2 for the second circuit block 201; an operation initiating signal INIT3 for the third circuit block 301 and the clock controller 600; and a parameter signal PRMTR3 for the third circuit block 301, respectively. The microcontroller 500 further generates, for the clock controller 600, a controller initiating signal INITC1 before generating the operation initiating signal INIT1, a controller initiating signal INITC2 before generating the operation initiating signal INIT2, and a controller initiating signal INITC3 before generating the operation initiating signal INIT3. The first circuit block 101 receives data input DIN, while the third circuit block 301 supplies data output DOUT. The second circuit block 201 supplies an address ADRS12 to the first circuit block 101 and an address ADRS23 to the third circuit block 301, respectively. DATA12 denotes data transmitted from the first circuit block 101 to the second circuit block 201. DATA23 denotes data transmitted from the second circuit block 201 to the third circuit block 301. The first circuit block 101 supplies a busy signal BUST1 to the microcontroller 500 and a request signal REQ1 to the clock controller 600, respectively, and receives gated clock signals GCLKC1, GCLKA1 and GCLKM1 from the clock controller 600. The second circuit block 200 supplies a busy signal BUSY2 to the microcontroller 500 and a request signal REQ2 to the clock controller 600, respectively, and receives gated clock signals GCLKC2, GCLKA2 and GCLKM2 from the clock controller 600. The third circuit block 301 supplies a busy signal BUSY3 to the microcontroller 500 and a request signal REQ3 to the clock controller 600, respectively, and receives gated clock signals GCLKC3, GCLKA3 and GCLKM3 from the clock controller 600.

Figure 11:
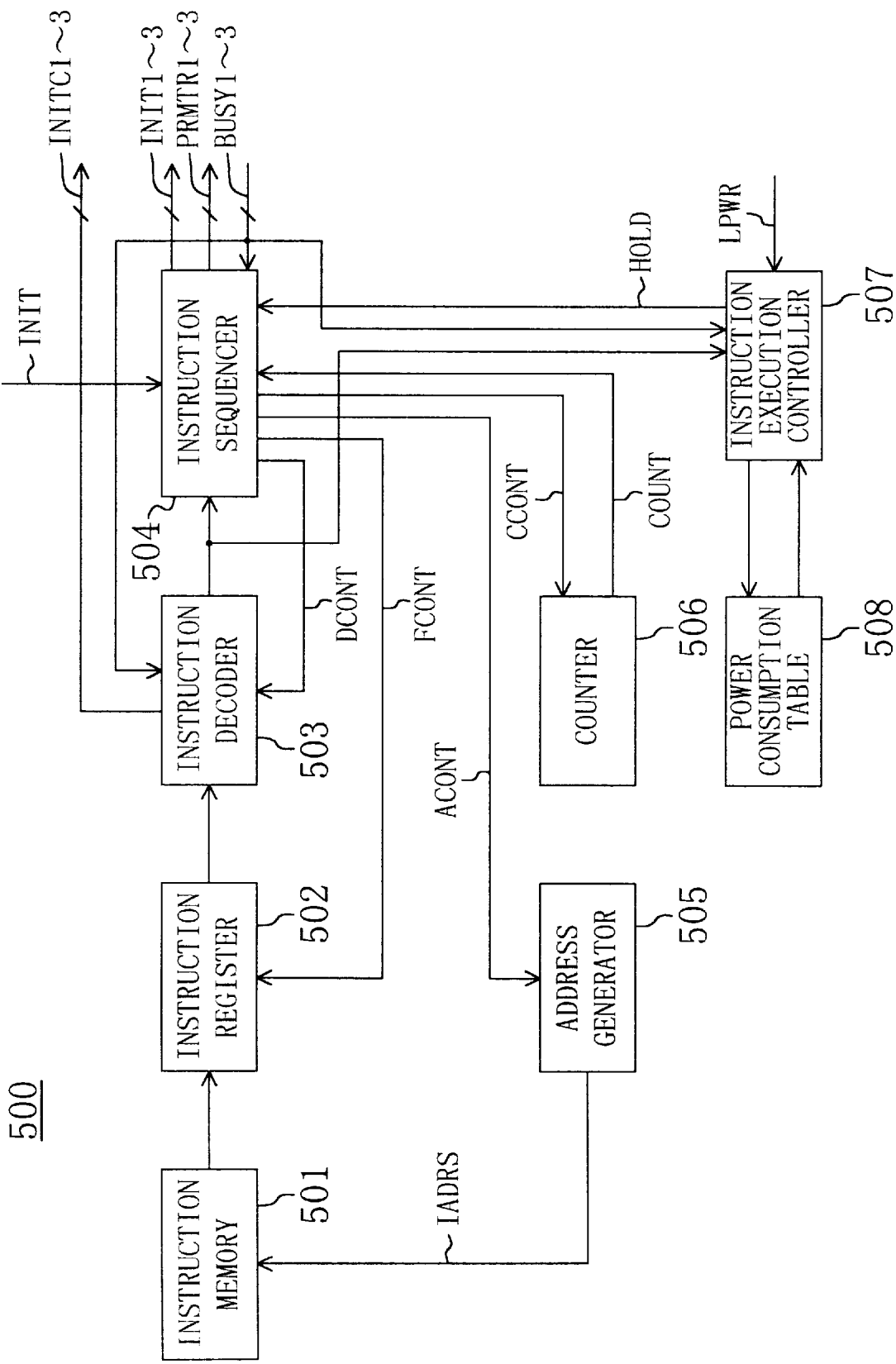
FIG. 11 is a block diagram illustrating an internal configuration for a microcontroller shown in FIG. 10.

FIG. 11 illustrates an internal configuration for the microcontroller 500 shown in FIG. 10. The microcontroller 500 includes: an instruction memory 501; an instruction register 502; an instruction decoder 503; an instruction sequencer 504; an address generator 505; a counter 506; an instruction execution controller 507; and a power consumption table 508. On receiving INIT from the outside, the instruction sequencer 504 starts to operate and supplies an address control signal ACONT to the address generator 505, a fetch control signal FCONT to the instruction register 502, a decode control signal DCONT to the instruction decoder 503 and a count control signal CCONT to the counter 506, respectively. The instruction memory 501 transmits an instruction, associated with an instruction address IADRS supplied from the address generator 505, to the instruction register 502. The instruction register 502 takes in the instruction pre-fetched from the instruction memory 501 only when it is allowed by FCONT. The instruction decoder 503 decodes the instruction output from the instruction register 502 only when it is allowed by DCONT. The result of decoding (including information indicating what type of operation processing the instruction requires, and information indicating in which circuit block the operation processing should be performed) is transmitted to the instruction sequencer 504 and the instruction execution controller 507. If the decoded instruction requires the performance of operation processing in the first circuit block 101, then the instruction decoder 503 generates INITC1 on condition that BUSY1 has been negated. If the decoded instruction requires the performance of operation processing in the second circuit block 201, then the instruction decoder 503 generates INITC2 on condition that BUSY2 has been negated. And if the decoded instruction requires the performance of operation processing in the third circuit block 301, then the instruction decoder 503 generates INITC3 on condition that BUSY3 has been negated. If the decoded instruction requires the performance of operation processing in the first circuit block 101, then the instruction sequencer 504 generates INIT1 and PRMTR1 on condition that BUSY1 has been negated. If the decoded instruction requires the performance of operation processing in the second circuit block 201, then the instruction sequencer 504 generates INIT2 and PRMTR2 on condition that BUSY2 has been negated. And if the decoded instruction requires the performance of operation processing in the third circuit block 301, then the instruction sequencer 504 generates INIT3 and PRMTR3 on condition that BUSY3 has been negated. The counter 506 supplies a counter value COUNT, indicating what instruction should be pre-fetched next time, to the instruction sequencer 504. BUSY1, BUSY2 and BUSY3 are also supplied to the instruction execution controller 507. On receiving LPWR from the outside, the instruction execution controller 507 starts to operate and predicts power consumption by reference to the power consumption table 508. If the predicted power consumption exceeds the maximum power consumption designated by LPWR, then a hold signal HOLD supplied from the instruction execution controller 507 to the instruction sequencer 504 is asserted. Even when the decoded instruction requires the performance of operation processing in the first circuit block 101, for example, the instruction sequencer 504 suspends the generation of INIT1 and PRMTR1 if HOLD has been asserted. In such a case, ACONT, FCONT, DCONT, and CCONT are deactivated so that pre-fetching and decoding of instructions do not advance any more.

Figure 12:
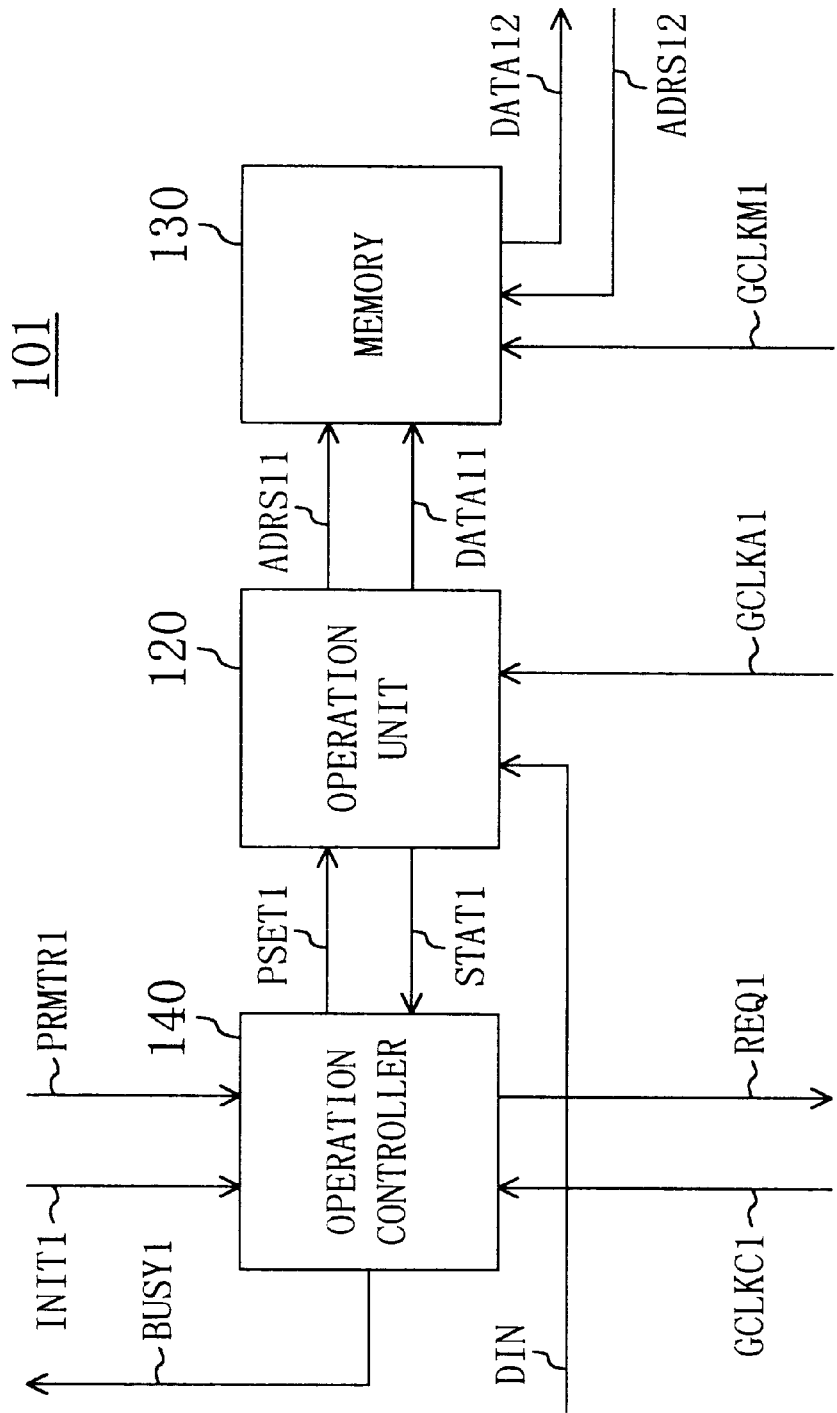
FIG. 12 is a block diagram illustrating an internal configuration for a first circuit block shown in FIG. 10.

FIG. 12 illustrates an internal configuration for the first circuit block 101 shown in FIG. 10. The first circuit block 101 includes: an operation controller 140; an operation unit 120; and a memory 130. The operation controller 140 is different from the operation controller 110 shown in FIG. 2 in that the controller 140 has the function of supplying BUSY1 and receives GCLKC1, instead of NGCLK1.

Figure 13:
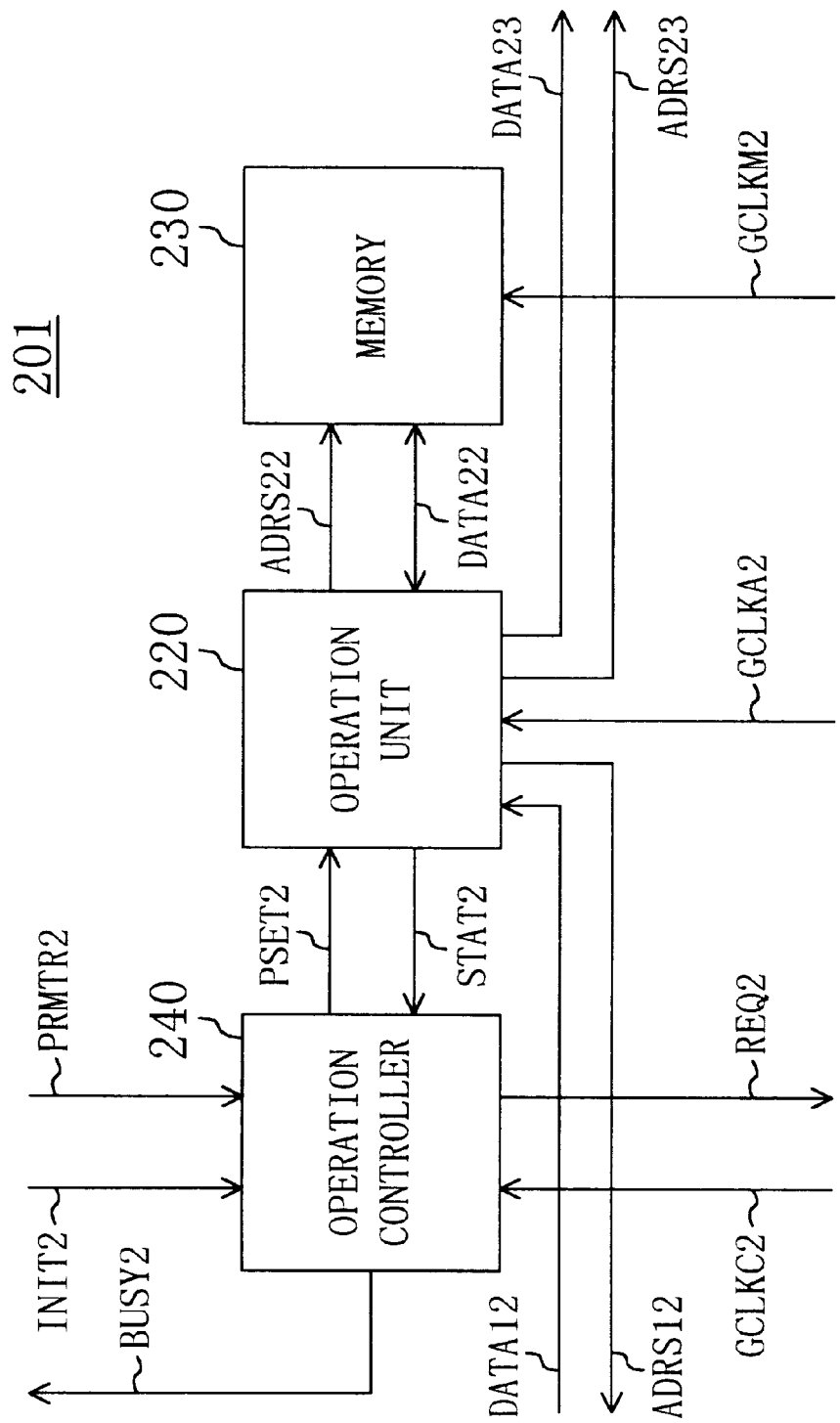
FIG. 13 is a block diagram illustrating an internal configuration for a second circuit block shown in FIG. 10.

FIG. 13 illustrates an internal configuration for the second circuit block 201 shown in FIG. 10. The second circuit block 201 includes: an operation controller 240; an operation unit 220; and a memory 230. The operation controller 240 is different from the operation controller 210 shown in FIG. 5 in that the controller 240 has the function of supplying BUSY2 and receives GCLKC2, instead of NGCLK2.

Figure 14:
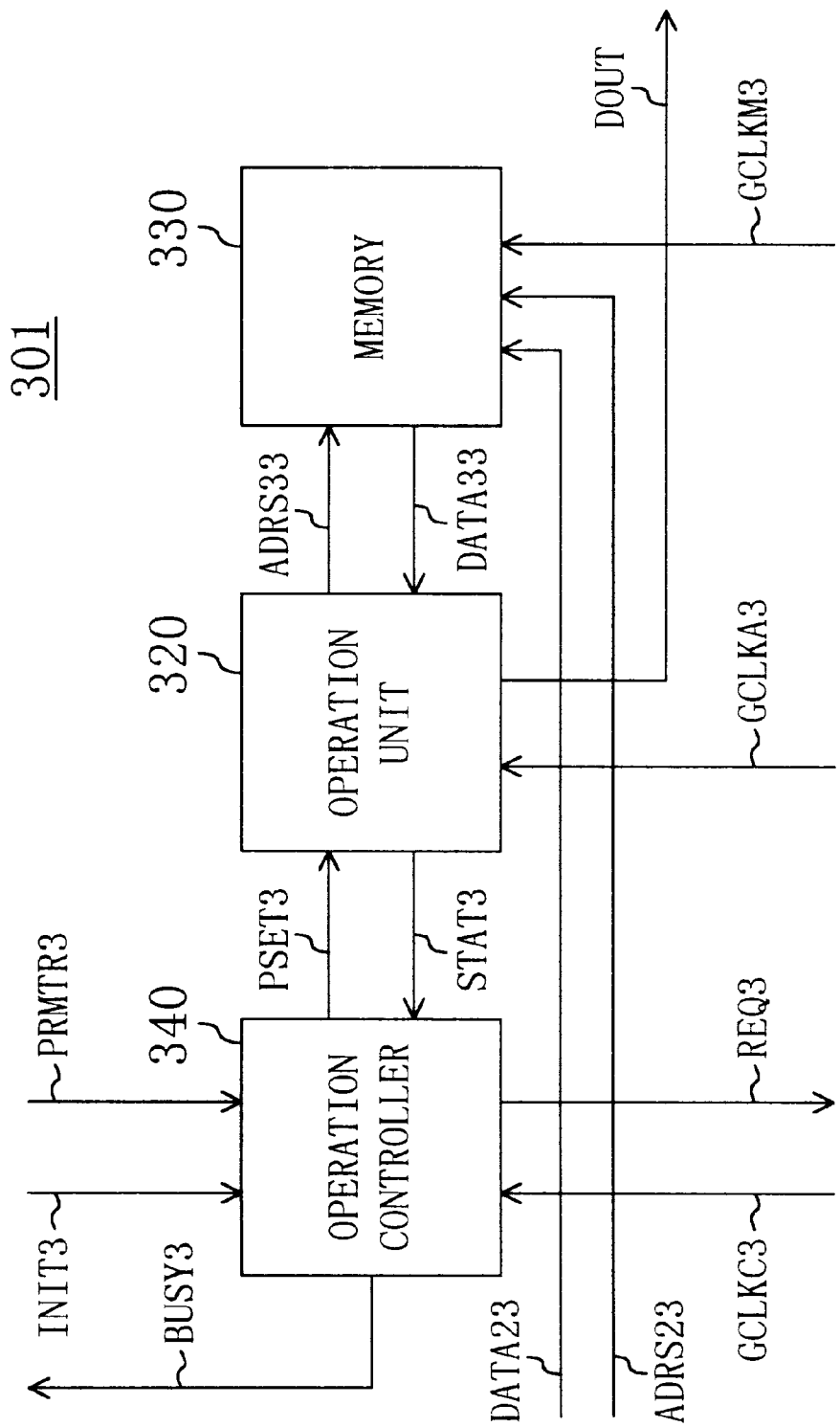
FIG. 14 is a block diagram illustrating an internal configuration for a third circuit block shown in FIG. 10.

FIG. 14 illustrates an internal configuration for the third circuit block 301 shown in FIG. 10. The third circuit block 301 includes: an operation controller 340; an operation unit 320; and a memory 330. The operation controller 340 is different from the operation controller 310 shown in FIG. 6 in that the controller 340 has the function of supplying BUSY3 and receives GCLKC3, instead of NGCLK3.

Figure 15:
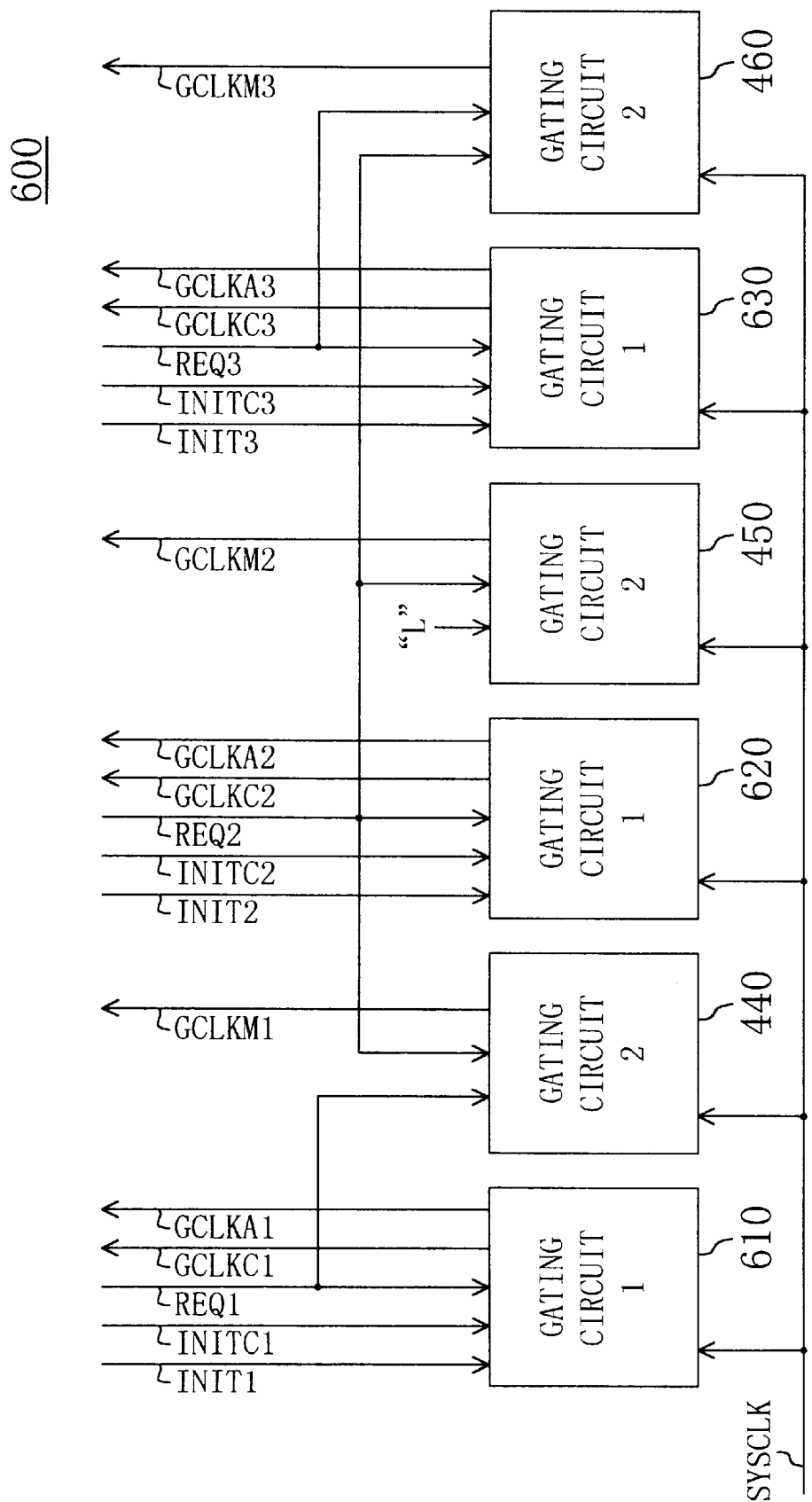
FIG. 15 is a block diagram illustrating an internal configuration for a clock controller shown in FIG. 10.

FIG. 15 illustrates an internal configuration for the clock controller 600 shown in FIG. 10. The clock controller 600 includes three first gating circuits 610, 620, 630, each having the same internal configuration, and three second gating circuits 440, 450, 460, each having the same internal configuration as that shown in FIG. 9. SYSCLK is supplied to all of these gating circuits. REQ1 supplied from the operation controller 140 is provided to the first gating circuit 610 and to the second gating circuit 440. REQ2 supplied from the operation controller 240 is provided to the first gating circuit 620 and to the three second gating circuits 440, 450, 460. One of the inputs of the second gating circuit 450 is fixed at L level. REQ3 supplied from the operation controller 340 is provided to the first gating circuit 630 and to the second gating circuit 460. The first gating circuit 610 receives INIT1 and INITC1, which have been generated from the microcontroller 500, and supplies GCLKC1 to the operation controller 140 and GCLKA1 to the operation unit 120, respectively. The first gating circuit 620 receives INIT2 and INITC2, which have been generated from the microcontroller 500, and supplies GCLKC2 to the operation controller 240 and GCLKA2 to the operation unit 220, respectively. The first gating circuit 630 receives INIT3 and INITC3, which have been generated from the microcontroller 500, and supplies GCLKC3 to the operation controller 340 and GCLKA3 to the operation unit 320, respectively. The second gating circuits 440, 450, 460 supply GCLKM1, GCLKM2, GCLKM3 to the memories 130, 230, 330, respectively.

Figure 16:
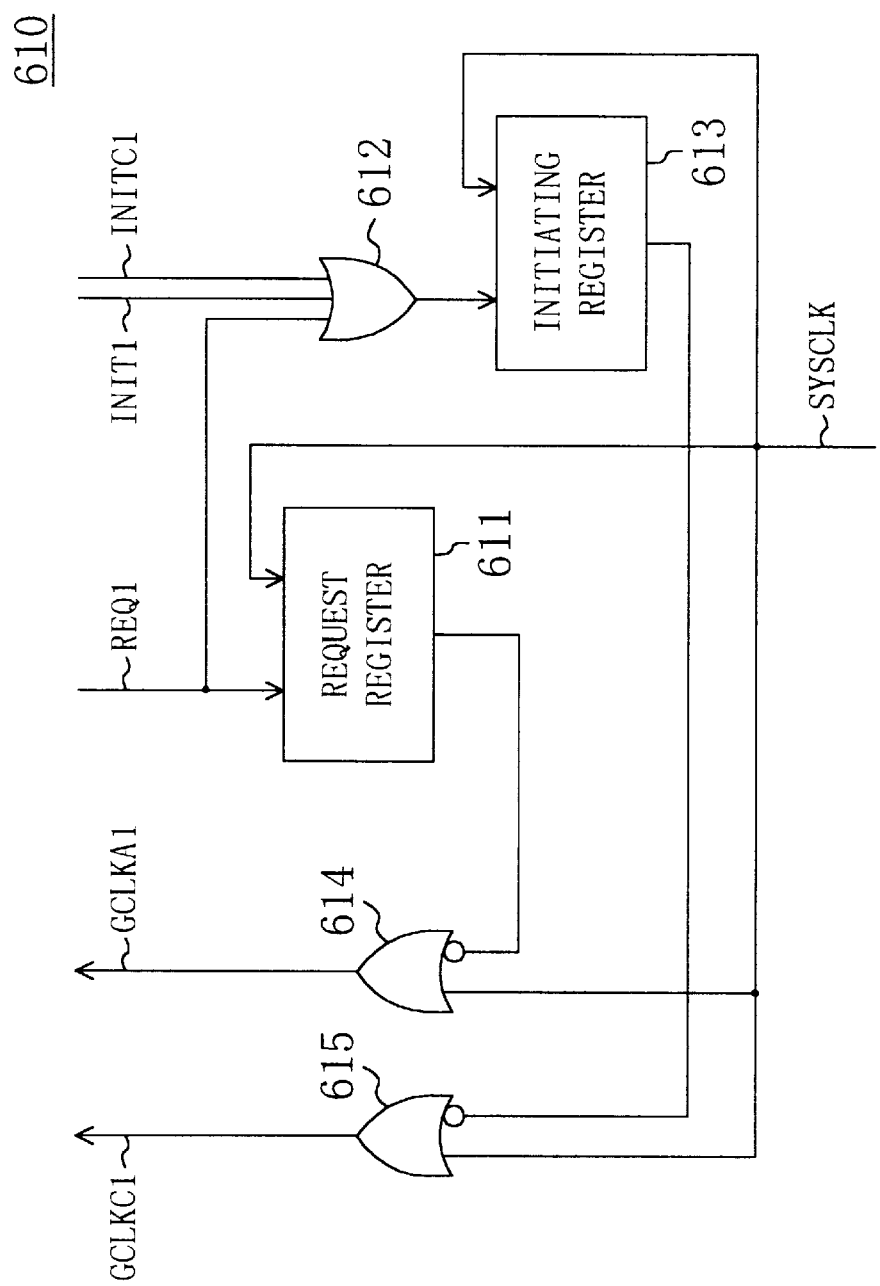
FIG. 16 is a block diagram illustrating an internal configuration for a first gating circuit shown in FIG. 15.

FIG. 16 illustrates an internal configuration for the first gating circuit 610 shown in FIG. 15. The first gating circuit 610 includes: a request register 611; a logic gate 612; an initiating register 613; and logic gates 614, 615. The request register 611 latches REQ1, supplied from the operation controller 140, in synchronism with SYSCLK. The logic gate 612 supplies OR of INITC1, INIT1 and REQ1 to the initiating register 613. The initiating register 613 latches the OR in synchronism with SYSCLK. If the output of the request register 611 is asserted to H level, then the logic gate 614 transmits SYSCLK to the operation unit 120 as GCLKA1. Alternatively, if the output of the request register 611 is negated to L level, then the logic gate 614 stops the transmission of SYSCLK to the operation unit 120. While the transmission of SYSCLK is stopped, GCLKA1 is fixed at H level. If the output of the initiating register 613 is asserted to H level, then the logic gate 615 transmits SYSCLK to the operation controller 140 as GCLKC1. Alternatively, if the output of the initiating register 613 is negated to L level, then the logic gate 615 stops the transmission of SYSCLK to the operation controller 140. While the transmission of SYSCLK is stopped, GCLKC1 is fixed at H level.

In the processor shown in FIG. 10, when INIT is asserted, the microcontroller 500 starts to operate in accordance with the program described in the instruction memory 501. The microcontroller 500 can operate the first, second and third circuit blocks 101, 201, 301 in parallel with each other. For example, if an instruction requiring the performance of operation processing in the first circuit block 101 has been decoded by the instruction decoder 503, then INITC1 is generated from the instruction decoder 503 on condition that BUSY1 has been negated and before INIT1 and PRMTR1 are generated from the instruction sequencer 504. In response to the assertion of INITC1, the first gating circuit 610 in the clock controller 600 starts to supply GCLKC1 to the operation controller 140. Thus, as soon as INIT1 is generated from the instruction sequencer 504, the operation controller 140 in the first circuit block 101 can assert REQ1 at H level. In response to the assertion of REQ1, the clock controller 600 starts to supply GCLKA1 to the operation unit 120 and GCLKM1 to the memory 130. The operation unit 120 performs operation processing on DIN and writes DATA11, resulting from the operation processing, into the memory 130. The status of the operation processing in the operation unit 120 is reflected in STAT1. The operation controller 140 determines whether or not STAT1 supplied from the operation unit 120 satisfies a predetermined end condition. If STAT1 satisfies the end condition, then the operation controller 140 negates REQ1 at L level. That is to say, at a point in time when the operation processing ends in the operation unit 120, REQ1 is returned to L level. In response to the negation of REQ1 to L level, the clock controller 600 stops the supply of GCLKC1 to the operation controller 140, the supply of GCLKA1 to the operation unit 120 and the supply of GCLKM1 to the memory 130.

As can be understood, in the processor shown in FIG. 10, the operation controllers 140, 240, 340 monitor the respective operating statuses of the operation units 120, 220 and 320 and allow the supply of a clock signal only to an operation unit actually operating, thereby realizing data-dependent clock gating. In addition, since the supply of a clock signal is allowed only to an operation controller designated by the instruction decoder 503, the power consumption of the processor can be further reduced as compared with the processor shown in FIG. 1.

FIG. 17 shows an exemplary content of the power consumption table 508 shown in FIG. 11. FIG. 18 shows an exemplary execution program of the processor shown in FIG. 10. The processor shown in FIG. 10 may control in such a manner that the total sum of the power consumed by the first, second and third circuit blocks 101, 201 and 301 does not exceed the maximum power consumption designated by LPWR. In the processor shown in FIG. 10, when LPWR is asserted, the maximum power consumption is set in the instruction execution controller 507 and the current value of power consumption per circuit block is initialized at "0". Herein, assume the maximum power consumption is set at "80". Subsequently, when INIT is asserted, the microcontroller 500 starts to operate in accordance with the program shown in FIG. 18. First, when Instruction SET is decoded by the instruction decoder 503, the instruction execution controller 507 refers to the power consumption table 508, thereby predicting that the power consumption would be increased by "1" if the operation unit 120 is made to perform the operation processing in accordance with Instruction SET. Since the total sum of power currently consumed by the respective circuit blocks is "0", it is understood that the power consumption will not exceed "80" even if the operation unit 120 is made to perform the operation processing in accordance with Instruction SET. Accordingly, the instruction execution controller 507 negates HOLD. The instruction sequencer 504 instantaneously generates INIT1 and PRMTR1 in accordance with Instruction SET. At this point in time, the instruction decoder 503 decodes the next Instruction MPY. The current value of power consumed by the first circuit block 101 is updated to "1" at the transition from L to H level of BUSY1. This current value is reset to "0" at the transition from H to L level of BUSY1. Thereafter, every time one instruction is decoded, the instruction execution controller 507 predicts in a similar manner how much the power consumption would be increased by the performance of operation processing in accordance with the decoded instruction. And if the power consumption exceeds "80", HOLD is asserted. In the example shown in FIG. 18, HOLD is asserted at a point in time when Instruction DCT is decoded. At this point in time, Instructions SET, MPY and ADD have already been executed. However, since Instruction VIF is still being executed, the total sum of power currently consumed is "45". Thus, as can be seen, if the operation processing is performed in accordance with Instruction DCT, then the power consumption will be "88", which exceeds "80". When HOLD is asserted, the instruction sequencer 504 suspends the generation of the operation initiating signal and the parameter signal. In this way, control is performed in such a manner that the total sum of power consumed by the first, second and third circuit blocks 101, 201 and 301 does not exceed "80", thereby leveling the power consumption.

Figure 19:
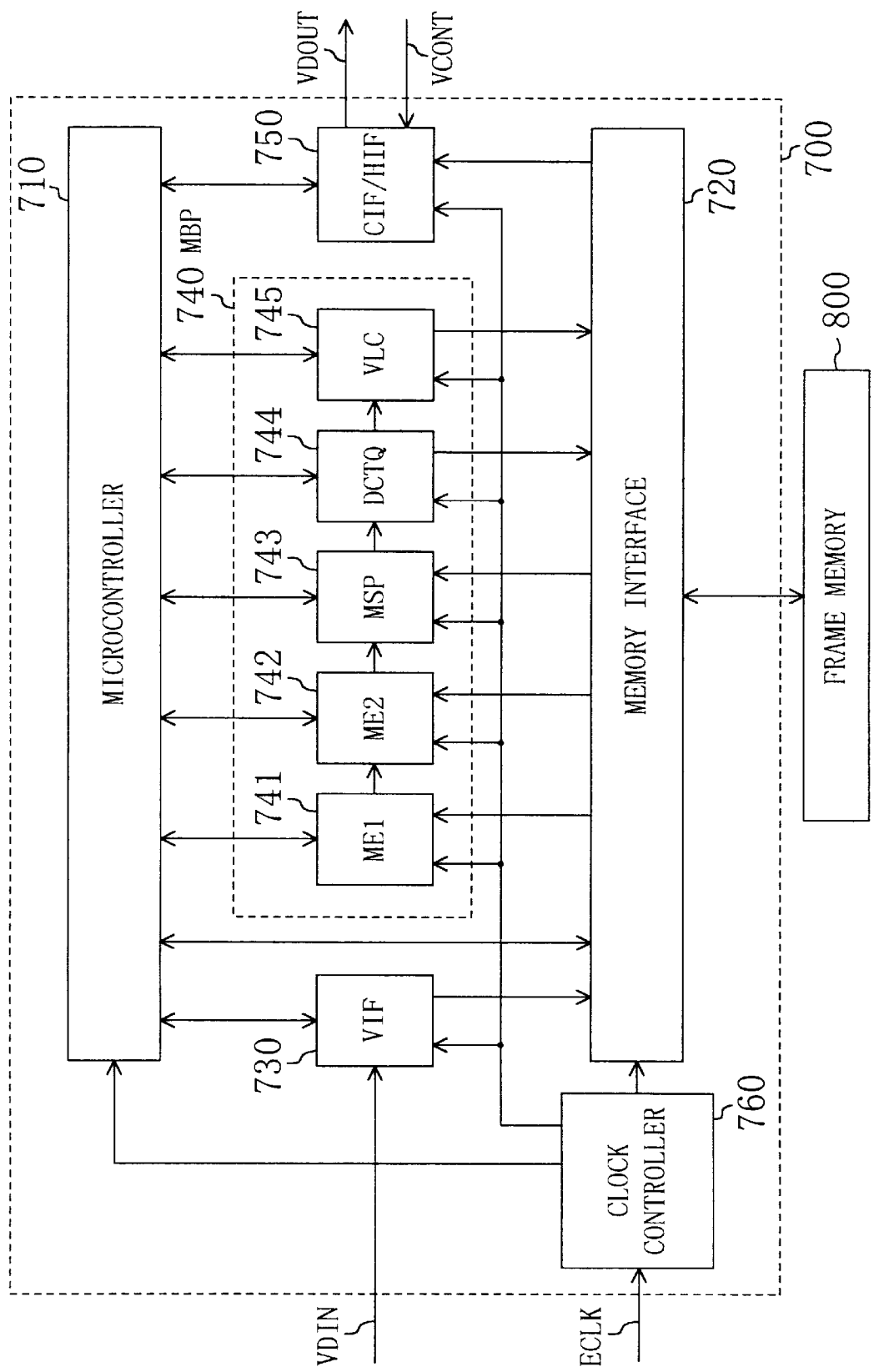
FIG. 19 is a block diagram illustrating still another exemplary configuration for a processor according to the present invention.

FIG. 19 illustrates still another exemplary configuration for a processor according to the present invention. The processor shown in FIG. 19 includes an MPEG video encoder 700 and a frame memory 800, which is made up of a plurality of synchronous DRAM's (dynamic random access memories). The MPEG video encoder 700 includes: a microcontroller 710; a memory interface 720; first, second and third circuit blocks 730, 740, 750, which can operate in parallel with each other; and a clock controller 760. The first circuit block 730 is a video input interface (VIF) block. The second circuit block 740 is a macroblock processing (MBP) block, and includes: a first motion estimation (first ME) block 741; a second motion estimation (second ME) block 742; a mode select processing (MSP) block 743; a DCT quantization (DCTQ) block 744; and a variable length coding (VLC) block 745. These five circuit blocks 741 through 745 constitute a macroblock pipeline. The third circuit block 750 is a code/host interface (CIF/HIF) block. VDIN denotes video data input provided to the VIF block 730. VDOUT denotes video data output (encoded output) supplied from the CIF/HIF block 750. VCONT denotes a control signal supplied from a host processor (not shown) to the CIF/HIF block 750. ECLK denotes a system clock signal supplied from the outside to the clock controller 760. The clock controller 760 supplies a non-gated clock signal to the microcontroller 710 and a gated clock signal to the memory interface 720. The clock controller 760 also supplies a gated clock signal to all of the seven circuit blocks 730, 741, 742, 743, 744, 745 and 750.

The microcontroller 710 is controllable based on a program and communicates with each of the memory interface 720, the VIF block 730, the MBP block 740 and the CIF/HIF block 750. The microcontroller 710 has the function of generating an operation initiating signal and a parameter signal for each of the five circuit blocks 741 through 745 in the MBP block 740, in particular.

When the VIF block 730 is initiated by the microcontroller 710, the VIF block 730 asserts a request signal, thereby requiring the supply of a clock signal. In response to the assertion of the request signal, the clock controller 760 starts to supply the clock signal to the VIF block 730. The VIF block 730 performs various types of processing such as data rearrangement for converting the video data input VDIN into an MPEG input format. Current image data representing the result of this processing is written into the frame memory 800 via the memory interface 720. When a series of data input processing is completed in this manner, the VIF block 730 negates the request signal. In response to the negation of the request signal, the clock controller 760 stops the supply of the clock signal to the VIF block 730.

On receiving an operation initiating signal and a parameter signal generated from the microcontroller 710, the first ME block 741 asserts a request signal, thereby requiring the supply of a clock signal. The parameter signal is a signal indicating which of a plurality of resources of the operation unit in the first ME block 741 should be used. In response to the assertion of the request signal, the clock controller 760 starts to supply a clock signal to the first ME block 741. The operation unit in the first ME block 741 reads out reference image data and current image data from the frame memory 800 via the memory interface 720, performs first motion estimation, e.g., the detection of a motion vector with the precision of one pixel, and sends the resulting vector data to the second ME block 742. When the processing on one macroblock is completed, the first ME block 741 negates the request signal. In response to the negation of the request signal, the clock controller 760 stops the supply of a clock signal to the first ME block 741.

No sooner has the second ME block 742 received an operation initiating signal and a parameter signal generated from the microcontroller 710 than the second ME block 742 asserts a request signal, thereby requiring the supply of a clock signal. The parameter signal is a signal indicating which of a plurality of resources of the operation unit in the second ME block 742 should be used. In response to the assertion of the request signal, the clock controller 760 starts to supply a clock signal to the second ME block 742. The operation unit in the second ME block 742 reads out reference image data and current image data from the frame memory 800 via the memory interface 720 based on the motion vector data, performs second motion estimation, e.g., the detection of a motion vector with the precision of half pixel and motion compensation, and sends the resulting differential data to the MSP block 743. When the processing on one macroblock is completed, the second ME block 742 negates the request signal. In response to the negation of the request signal, the clock controller 760 stops the supply of a clock signal to the second ME block 742.

Hardly has the MSP block 743 received an operation initiating signal and a parameter signal generated from the microcontroller 710 when the MSP block 743 asserts a request signal, thereby requiring the supply of a clock signal. The parameter signal is a signal indicating which of a plurality of resources of the operation unit in the MSP block 743 should be used. In response to the assertion of the request signal, the clock controller 760 starts to supply a clock signal to the MSP block 743. The operation unit in the MSP block 743 performs statistical calculations of a macroblock and preparation of data for DCT based on the differential data and delivers the resulting data to the DCTQ block 744. When the processing on one macroblock is completed, the MSP block 743 negates the request signal. In response to the negation of the request signal, the clock controller 760 stops the supply of a clock signal to the MSP block 743.

As soon as the DCTQ block 744 receives an operation initiating signal and a parameter signal generated from the microcontroller 710, the DCTQ block 744 asserts a request signal, thereby requiring the supply of a clock signal. The parameter signal is a signal indicating which of a plurality of resources of the operation unit in the DCTQ block 744 should be used. In response to the assertion of the request signal, the clock controller 760 starts to supply a clock signal to the DCTQ block 744. The operation unit in the DCTQ block 744 performs DCT operation and quantization on the macroblock based on the prepared data and then delivers the resulting data to the VLC block 745. When the processing on one macroblock is completed, the DCTQ block 744 negates the request signal. In response to the negation of the request signal, the clock controller 760 stops the supply of a clock signal to the DCTQ block 744.

Scarcely has the VLC block 745 received an operation initiating signal and a parameter signal generated from the microcontroller 710 before the VLC block 745 asserts a request signal, thereby requiring the supply of a clock signal. The parameter signal is a signal indicating which of a plurality of resources of the operation unit in the VLC block 745 should be used. In response to the assertion of the request signal, the clock controller 760 starts to supply a clock signal to the VLC block 745. The operation unit in the VLC block 745 performs variable length coding based on the delivered data. The encoded data representing the result of this processing is written into the frame memory 800 via the memory interface 720. When the processing on one macroblock is completed, the VLC block 745 negates the request signal. In response to the negation of the request signal, the clock controller 760 stops the supply of a clock signal to the VLC block 745.

When the CIF/HIF block 750 is initiated by the microcontroller 710, the CIF/HIF block 750 asserts a request signal, thereby requiring the supply of a clock signal. In response to the assertion of the request signal, the clock controller 760 starts to supply a clock signal to the CIF/HIF block 750. The CIF/HIF block 750 reads out the encoded data from the frame memory 800 via the memory interface 720 at a specified time and supplies the video data output VDOUT to the outside. When a series of data output processing is completed in this manner, the CIF/HIF block 750 negates the request signal. In response to the negation of the request signal, the clock controller 760 stops the supply of a clock signal to the CIF/HIF block 750. It is noted that the CIF/HIF block 750 also has the function of transmitting a control signal VCONT, supplied from a host processor (not shown), to the microcontroller 710.

Figure 20:
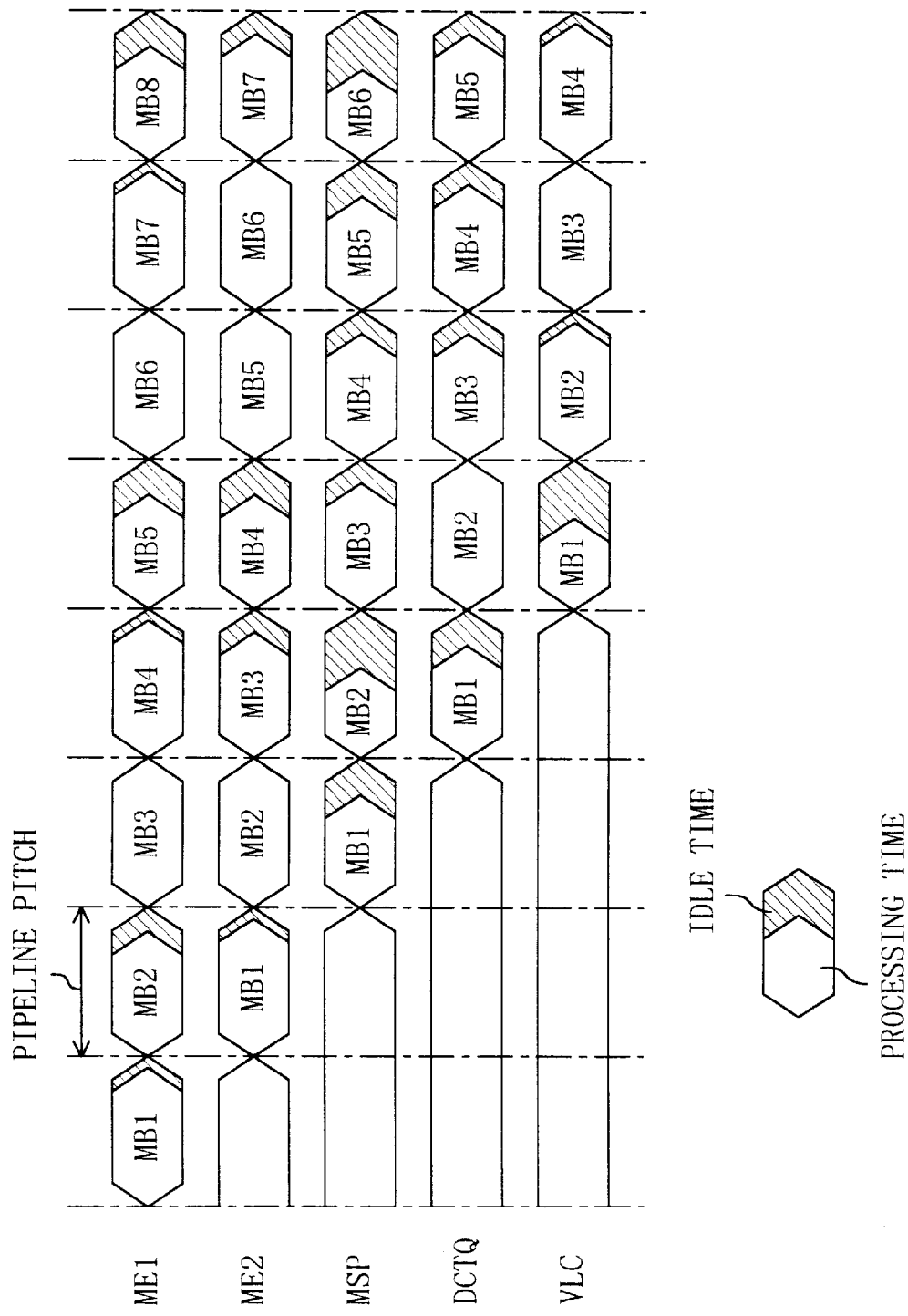
FIG. 20 is a timing chart illustrating an exemplary operation of the processor shown in FIG. 19.

FIG. 20 illustrates the pipeline operation performed by the first ME block 741, the second ME block 742, the MSP block 743, the DCTQ block 744 and the VLC block 745 in the processor shown in FIG. 19. In FIG. 20, MB1 through MB8 denote respective macroblocks to be processed. A pipeline pitch is set at the maximum value of the time interval required for each circuit block to process one macroblock. In FIG. 20, the hatched portions represent idle times. That is to say, in each of these five circuit blocks 741 through 745, the processing time for one macroblock is dependent on image data. A circuit block, which has completed the operation processing thereof earlier, negates the request signal for the clock controller 760 earlier. As a result, in each idle time, the supply of a clock signal is stopped and the power consumption of the processor is reduced. Specifically, in the first and second ME blocks 741 and 742, at a point in time when the address generator finishes searching all reference image data or when an operation circuit finds a region, most similar to the current image data, out of the reference image data, the request signal is negated. In the VLC block 745, the amount of data to be processed where the motion estimation has succeeded is greatly different from the amount where the motion estimation has failed.

It should be noted that the present invention is also effectively applicable to various processors for other applications, such as an MPEG video decoder.

What is claimed is:

1. A processor comprising:
    an operation unit having the functions of performing operation processing on data and supplying a status signal representing the status of the operation processing;
    a microcontroller having the function of generating an operation initiating signal;
    an operation controller for asserting a request signal when the operation controller receives the operation initiating signal generated from the microcontroller, for determining whether or not the status signal supplied from the operation unit satisfies a predetermined end condition, and for negating the request signal if the status signal satisfies the end condition; and
    a clock controller for supplying a clock signal to the operation unit such that the operation unit is allowed to perform the operation processing if the request signal has been asserted, and for stopping the supply of the clock signal to the operation unit if the request signal has been negated, wherein the clock controller comprises;
    a request register for latching the request signal in synchronism with a system clock signal supplied thereto;
    means for transmitting the system clock signal to the operation unit if the output of the request register has been asserted, and for stopping the transmission of the system clock signal to the operation unit if the output of the request register has been negated; and
    means for always transmitting the system clock signal to the operation controller.

2. The processor of claim 1, wherein the microcontroller further has the function of generating a parameter signal indicating which of a plurality of resources of the operation unit is to be used,
    and wherein the operation controller further has the functions of setting an internal configuration for the operation unit in response to the parameter signal, and changing the end condition in response to the parameter signal.

3. The processor of claim 1, wherein the microcontroller further has the functions of:
    predicting whether or not power to be consumed when the operation unit is made to perform the operation processing exceeds predetermined maximum power consumption;
    instantaneously generating the operation initiating signal if the power consumption does not exceed the maximum power consumption; and
    suspending the generation of the operation initiating signal if the power consumption does exceed the maximum power consumption.

4. The processor of claim 1, wherein the operation unit is a unit processing image data.

5. A processor comprising:
    an operation unit having the functions of performing operation processing on data and supplying a status signal representing the status of the operation processing;
    a microcontroller having the function of generating an operation initiating signal;
    an operation controller for asserting a request signal when the operation controller receives the operation initiating signal generated from the microcontroller, for determining whether or not the status signal supplied from the operation unit satisfies a predetermined end condition, and for negating the request signal if the status signal satisfies the end condition; and
    a clock controller for supplying a clock signal to the operation unit such that the operation unit is allowed to perform the operation processing if the request signal has been asserted, and for stopping the supply of the clock signal to the operation unit if the request signal has been negated,
    wherein the clock controller comprises,
        a request register for latching the request signal in synchronism with a system clock signal supplied thereto; and
        means for transmitting the system clock signal to the operation unit if the output of the request register has been asserted, and for stopping the transmission of the system clock signal to the operation unit if the output of the request register has been negated, and
    wherein the microcontroller further has the function of generating a controller initiating signal prior to generating the operation initiating signal, and
    wherein the clock controller further comprises,
        an initiating register for latching an OR of the controller initiating signal, the operation initiating signal and the request signal in synchronism with the system clock signal; and
        means for transmitting the system clock signal to the operation controller such that the operation controller is allowed to operate if the output of the initiating register has been asserted and for stopping the transmission of the system clock signal to the operation controller if the output of the initiating register has been negated.

6. The processor of claim 5, wherein the microcontroller further has the function of generating a parameter signal indicating which of a plurality of resources of the operation unit is to be used, and wherein the operation controller further has the functions of setting an internal configuration for the operation unit in response to the parameter signal, and changing the end condition in response to the parameter signal.

7. The processor of claim 5, wherein the microcontroller further has the functions of:
   predicting whether or not power to be consumed when the operation unit is made to perform the operation processing exceeds predetermined maximum power consumption;
   instantaneously generating the operation initiating signal if the power consumption does not exceed the maximum power consumption; and
   suspending the generation of the operation initiating signal if the power consumption does exceed the maximum power consumption.

8. The processor of claim 5, wherein the operation unit is a unit processing image data.

9. A processor comprising:
   a plurality of operation units, each having the functions of performing operation processing on data and supplying a status signal representing the status of the operation processing;
   a microcontroller having the function of generating operation initiating signals for the respective operation units;
   a plurality of operation controllers, each asserting a request signal when each said operation controller receives an associated one of the operation initiating signals generated from the microcontroller, determining whether or not the status signal supplied from an associated one of the operation units satisfies a predetermined end condition, and negating the request signal if the status signal satisfies the end condition; and
   a clock controller for supplying, if the request signal has been asserted by any of the operation controllers, a clock signal to the operation unit corresponding to the request signal, and for stopping the supply of the clock signal to the operation unit if the request signal has been negated, wherein the clock controller comprises,
      a plurality of request registers, each latching an associated one of the request signals in synchronism with a system clock signal supplied thereto;
      means for transmitting the system clock signal to an associated one of the operation units if the output of an associated one of the request registers has been asserted, and for stopping the transmission of the system clock signal to the operation unit if the output of the request register has been negated; and
      means for always transmitting the system clock signal to the operation controllers.

10. The processor of claim 9, wherein each of the operation units is a partial processing unit for encoding MPEG image data.

11. A processor comprising:
   a plurality of operation units, each having the functions of performing operation processing on data and supplying a status signal representing the status of the operation processing;
   a microcontroller having the function of generating operation initiating signals for the respective operation units;
   a plurality of operation controllers, each asserting a request signal when each said operation controller receives an associated one of the operation initiating signals generated from the microcontroller, determining whether or not the status signal supplied from an associated one of the operation units satisfies a predetermined end condition, and negating the request signal if the status signal satisfies the end condition; and
   a clock controller for supplying, if the request signal has been asserted by any of the operation controllers, a clock signal to the operation unit corresponding to the request signal, and for stopping the supply of the clock signal to the operation unit if the request signal has been negated,
   wherein the clock controller comprises,
      a plurality of request registers, each latching an associated one of the request signals in synchronism with a system clock signal supplied thereto;
      means for transmitting the system clock signal to an associated one of the operation units if the output of an associated one of the request registers has been asserted, and for stopping the transmission of the system clock signal to the operation unit if the output of the request register has been negated, and
   wherein the microcontroller further has the function of generating controller initiating signals prior to generating an associated one of the operation initiating signals, and
   wherein the clock controller further comprises,
      a plurality of initiating registers, each latching an OR of an associated one of the controller initiating signals, an associated one of the operation initiating signals and an associated one of the request signals in synchronism with the system clock signal; and
      means for transmitting the system clock signal to an associated one of the operation controllers such that the operation controller is allowed to operate if the output of an associated one of the initiating registers has been asserted and for stopping the transmission of the system clock signal to the operation controller if the output of the initiating register has been negated.

12. The processor of claim 11, wherein each of the operation units is a partial processing unit for encoding MPEG image data.

* * * * *